(12) United States Patent
Thompson et al.

(10) Patent No.: US 9,858,748 B2
(45) Date of Patent: Jan. 2, 2018

(54) FRONT-MOUNTED DISPLAY

(71) Applicant: Cadillac Jack Inc., Duluth, GA (US)

(72) Inventors: Mark Andrew Thompson, Buford, GA (US); Prashant L. Shah, Elk Grove Village, IL (US)

(73) Assignee: Cadillac Jack Inc., Duluth, GA (US)

( * ) Notice: Subject to any disclaimer, the term of this patent is extended or adjusted under 35 U.S.C. 154(b) by 372 days.

(21) Appl. No.: 13/872,016

(22) Filed: Apr. 26, 2013

(65) Prior Publication Data

US 2014/0323212 A1 Oct. 30, 2014

(51) Int. Cl.
*G07F 17/32* (2006.01)
*G06F 1/16* (2006.01)
*A63F 13/25* (2014.01)
*A63F 9/24* (2006.01)

(52) U.S. Cl.
CPC .......... *G07F 17/3211* (2013.01); *A63F 13/25* (2014.09); *G06F 1/1654* (2013.01); *A63F 2009/2457* (2013.01)

(58) Field of Classification Search
USPC ................ 345/1.3; 361/679.29; 248/917
See application file for complete search history.

(56) References Cited

U.S. PATENT DOCUMENTS

| | | | | |
|---|---|---|---|---|
| 4,856,088 | A * | 8/1989 | Oliwa .................... | G08B 5/225 340/7.54 |
| 2004/0018870 | A1* | 1/2004 | Cole ....................... | A63F 13/08 463/20 |
| 2005/0215325 | A1* | 9/2005 | Nguyen et al. ................. | 463/46 |
| 2007/0295020 | A1* | 12/2007 | Lee ......................... | F16M 11/08 62/259.2 |
| 2008/0113819 | A1* | 5/2008 | Tedsen ................ | G07F 17/3216 463/46 |
| 2010/0188808 | A1* | 7/2010 | Howarth ............... | G06F 1/1632 361/679.41 |

* cited by examiner

*Primary Examiner* — Kang Hu
*Assistant Examiner* — Robert T Clarke, Jr.
(74) *Attorney, Agent, or Firm* — Weide & Miller, Ltd.

(57) ABSTRACT

Examples disclosed herein relate to a front-mounted display utilized to enhance the installation of a display on an electronic gaming device. The systems and methods may allow for easier installation of a display on the electronic gaming device via a front-mounted display. One or more electrical interconnection points may be electrically connected with one or more electrical attachment points to form one or more electrical connects between the electronic gaming device and one or more displays.

23 Claims, 23 Drawing Sheets

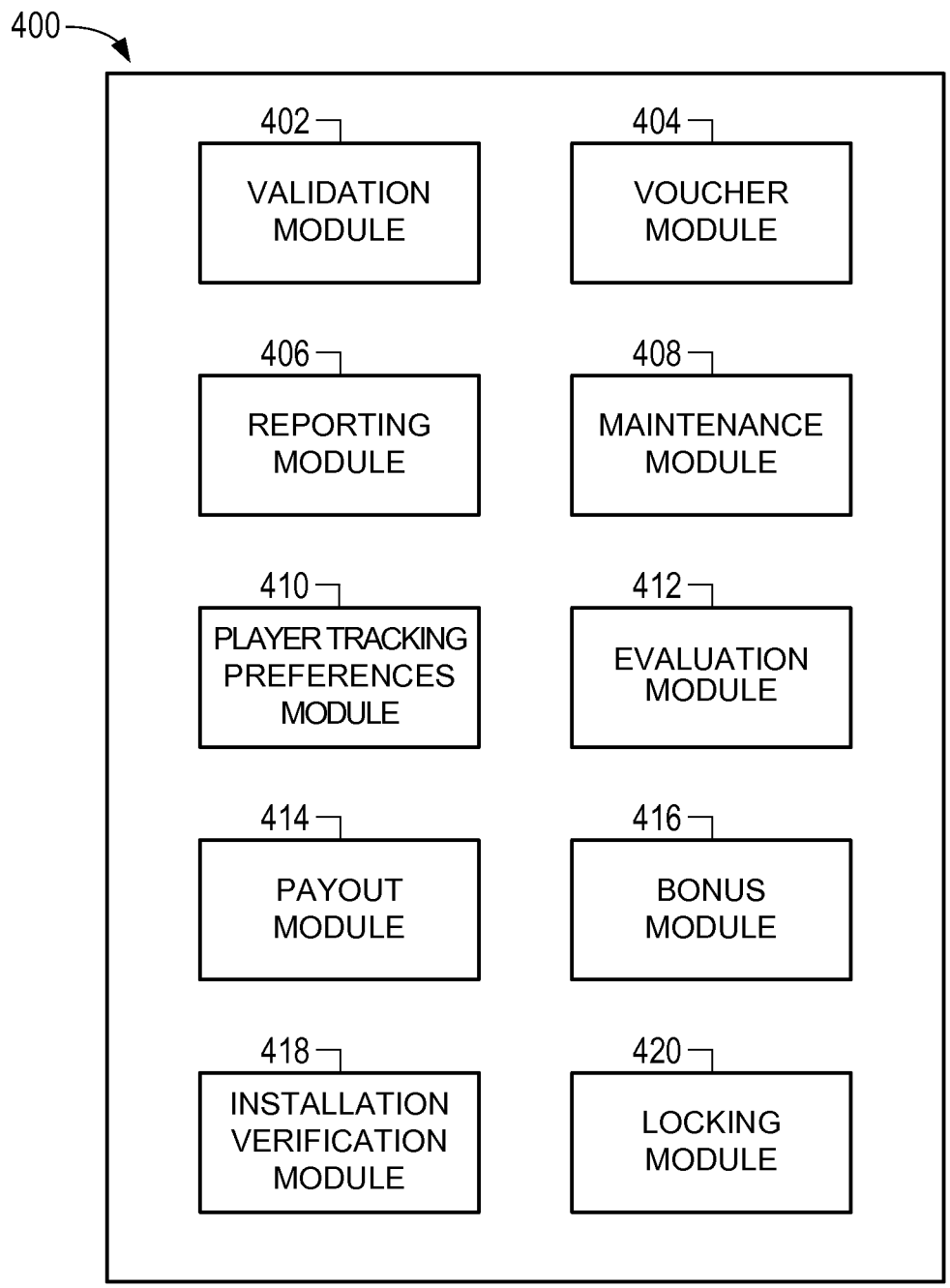

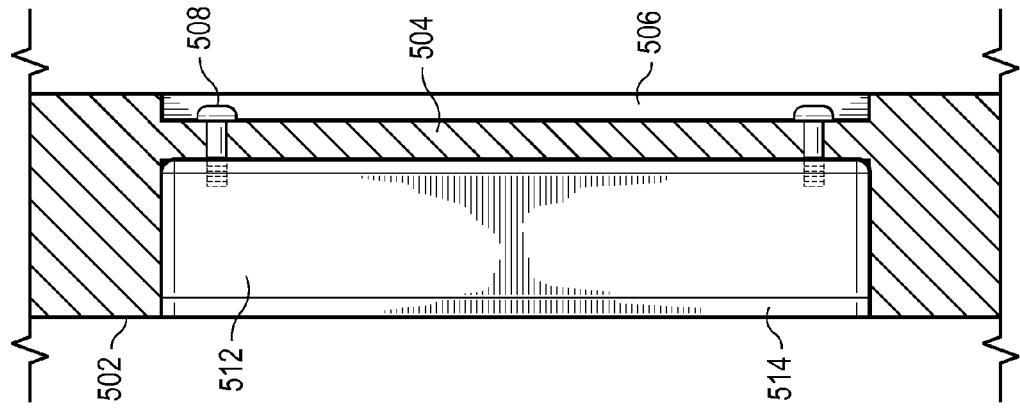
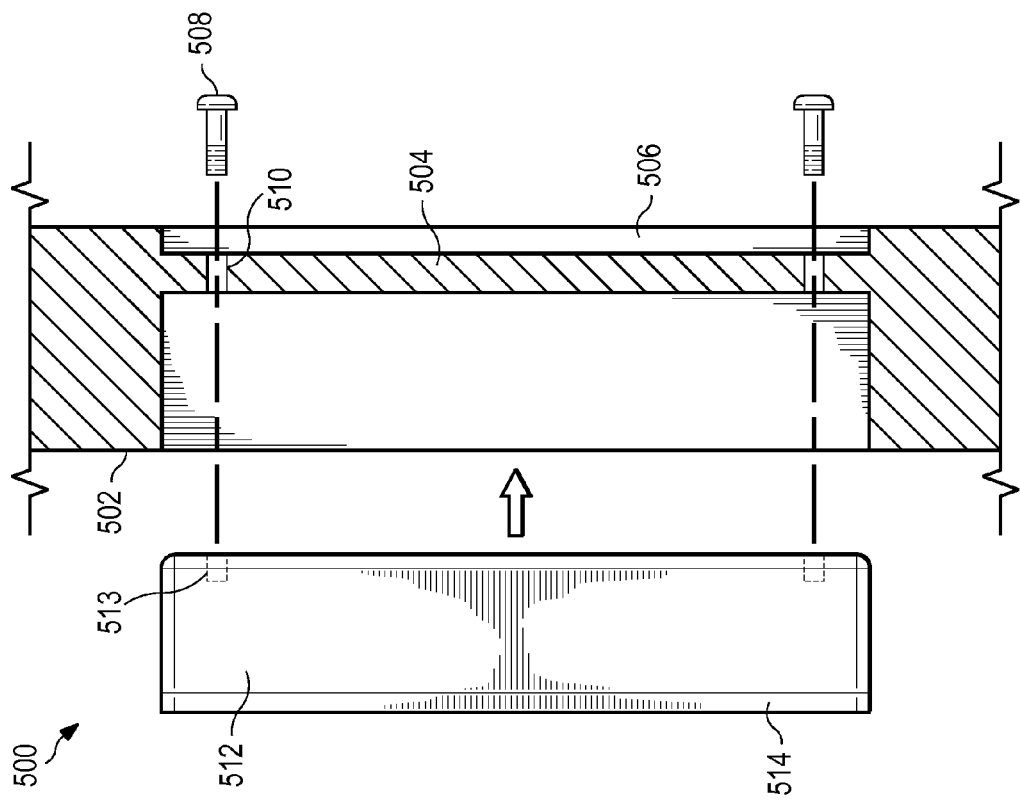

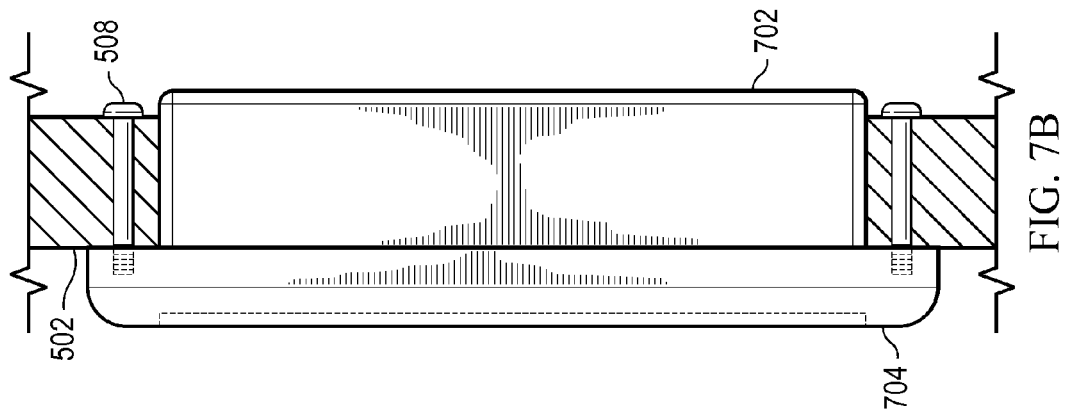
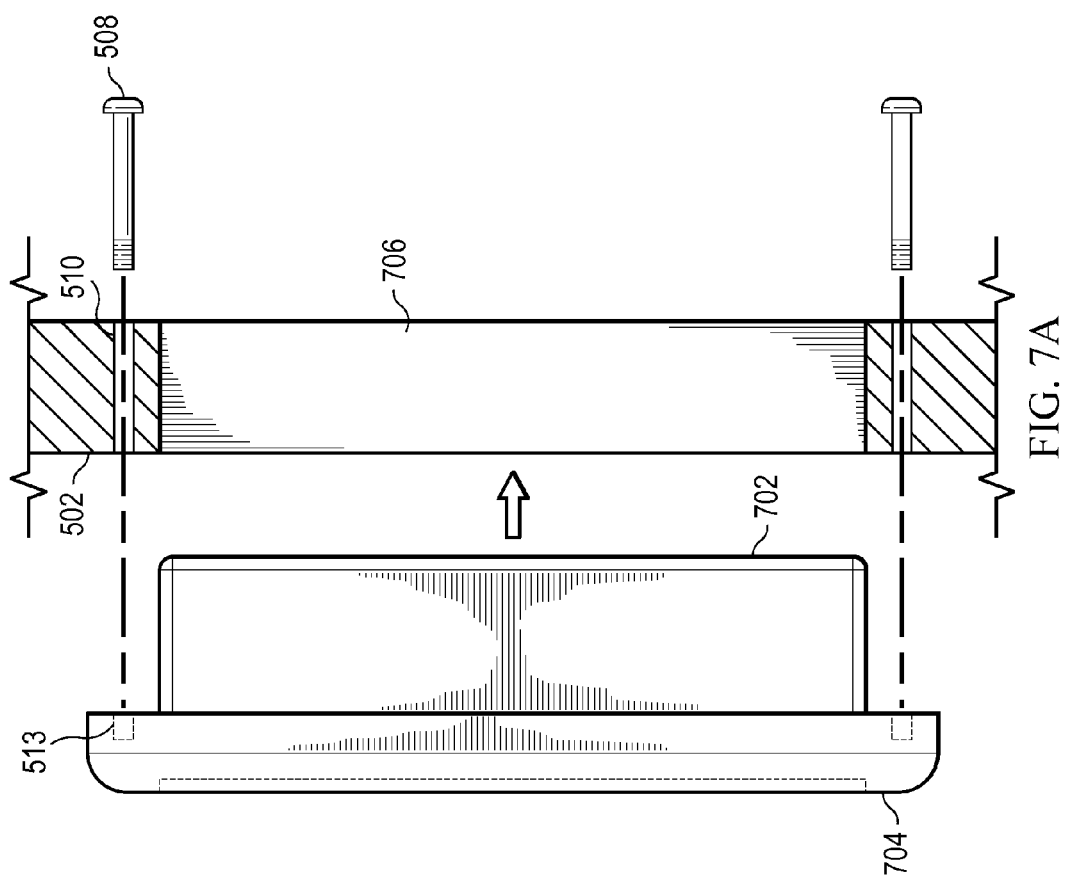

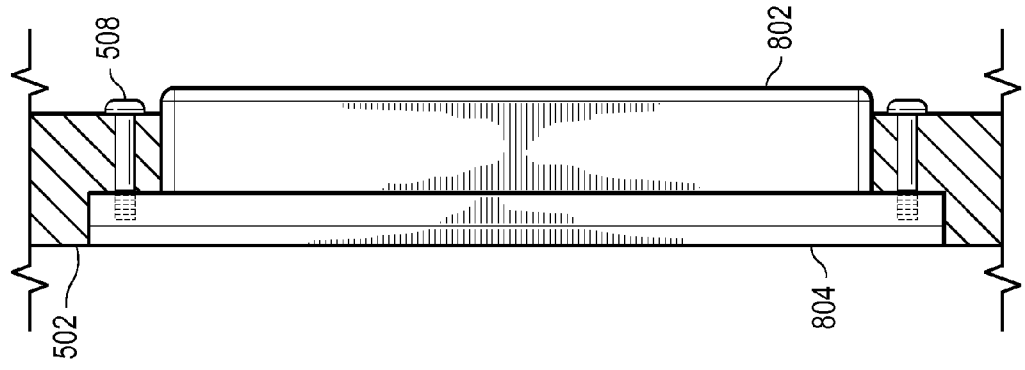
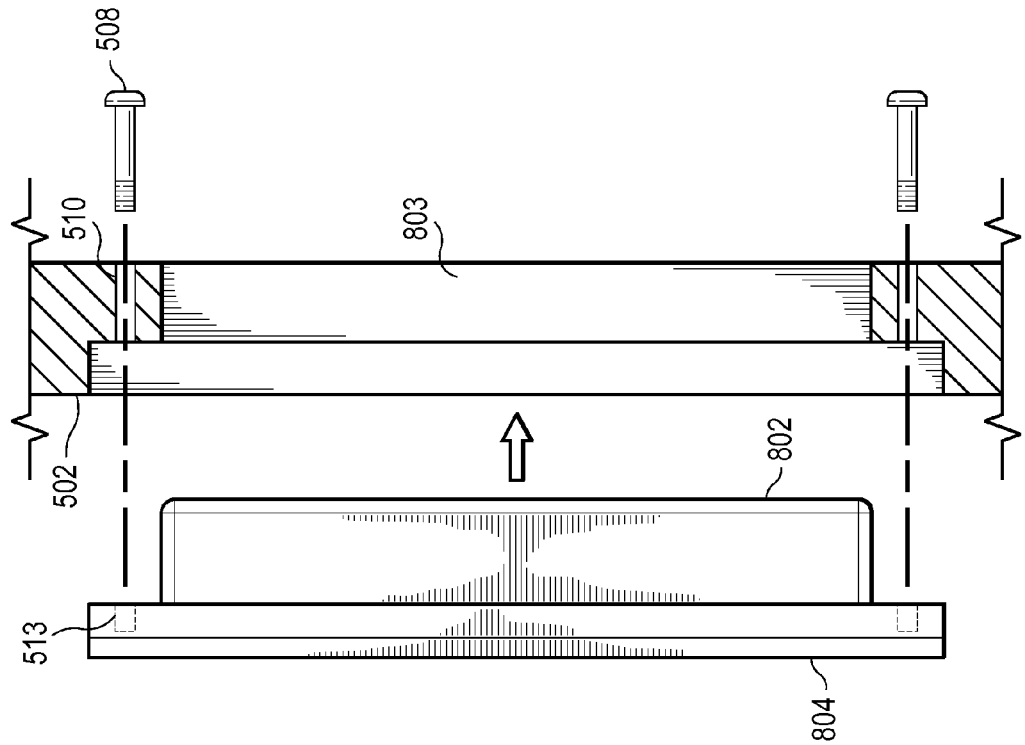

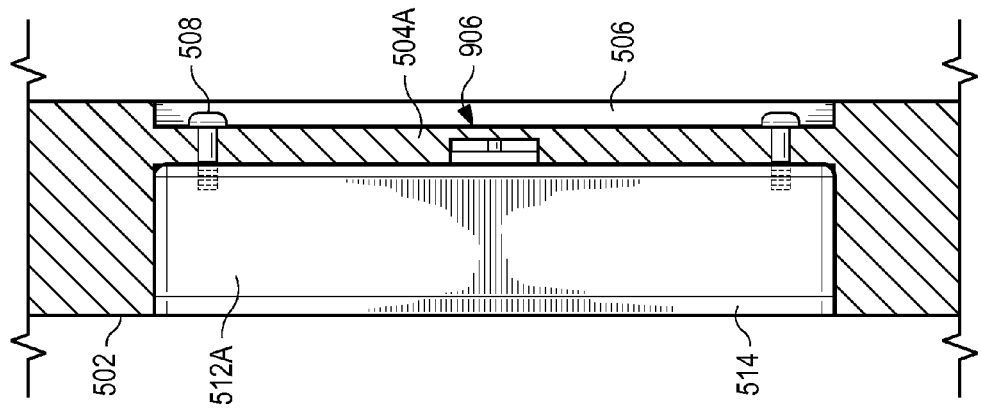
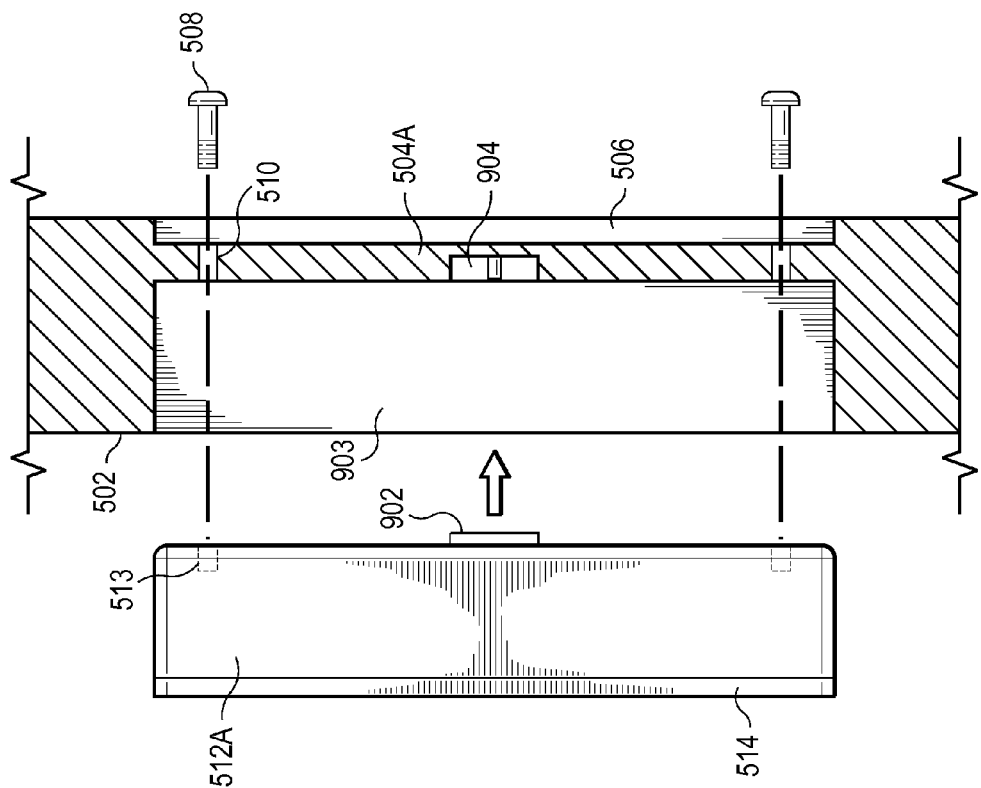

FRONT-MOUNTED DISPLAY

FIELD

The subject matter disclosed herein relates to an electronic gaming device. More specifically, the disclosure relates to a front-mounted display for the electronic gaming device.

INFORMATION

The gaming industry has numerous casinos located both worldwide and in the United States. A client of a casino or other gaming entity can gamble via various games of chance. For example, craps, roulette, baccarat, blackjack, and electronic games (e.g., a slot machine) where a person may gamble on an outcome.

Paylines of an electronic gaming device (e.g., a slot machine) are utilized to determine when predetermined winning symbol combinations are aligned in a predetermined pattern to form a winning combination. A winning event occurs when the player successfully matches the predetermined winning symbols in one of the predetermined patterns.

When manufacturing, modifying, and/or repairing an electronic gaming machine, the installation and/or changing of the display screen can be an inefficient process. By utilizing a front-mounted display this process may be improved.

BRIEF DESCRIPTION OF THE FIGURES

Non-limiting and non-exhaustive examples will be described with reference to the following figures, wherein like reference numerals refer to like parts throughout the various figures.

FIG. 4 is another block diagram of the electronic gaming device, according to one embodiment.

FIGS. 5A and 5B are illustrations of the front-mounted display, according to various embodiments.

FIGS. 7A and 7B are illustrations of the front-mounted display, according to various embodiments.

FIGS. 8A and 8B are illustrations of the front-mounted display, according to various embodiments.

FIGS. 9A and 9B are illustrations of the front-mounted display, according to various embodiments.

DETAILED DESCRIPTION

Figure 1:
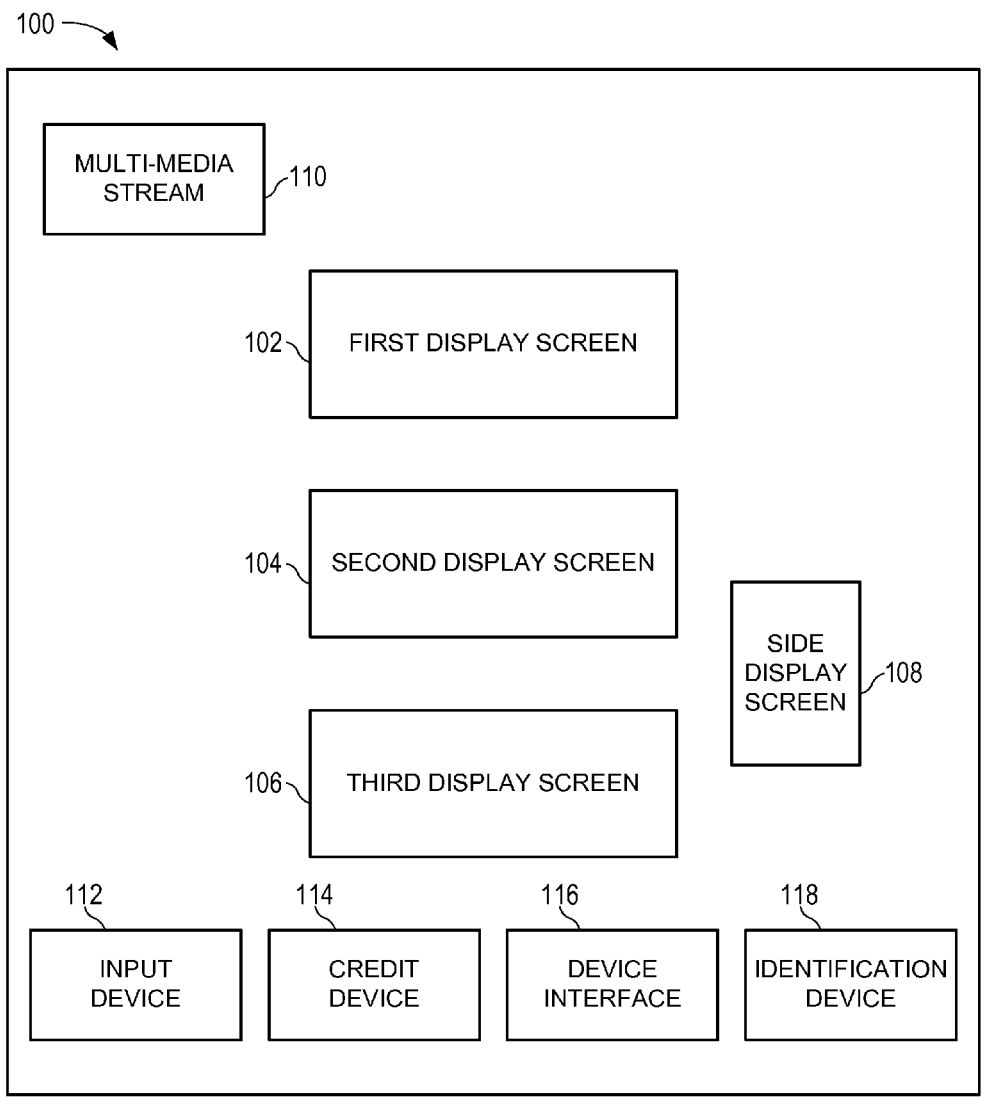
FIG. 1 is an illustration of the electronic gaming device, according to one embodiment.

FIG. 1 is an illustration of an electronic gaming device 100. Electronic gaming device 100 may include a multi-media stream 110, a first display screen 102, a second display screen 104, a third display screen 106, a side display screen 108, an input device 112, a credit device 114, a device interface 116, and an identification device 118. Electronic gaming device 100 may display one, two, a few, or a plurality of multi-media streams 110, which may be obtained from one or more gaming tables, one or more electronic gaming devices, a central server, a video server, a music server, an advertising server, another data source, and/or any combination thereof.

Multi-media streams may be obtained for an entertainment event, a wagering event, a promotional event, a promotional offering, an advertisement, a sporting event, any other event, and/or any combination thereof. For example, the entertainment event may be a concert, a show, a television program, a movie, an Internet event, and/or any combination thereof. In another example, the wagering event may be a poker tournament, a horse race, a car race, and/or any combination thereof. The advertisement may be an advertisement for a casino, a restaurant, a shop, any other entity, and/or any combination thereof. The sporting event may be a football game, a baseball game, a hockey game, a basketball game, any other sporting event, and/or any combination thereof. These multi-media streams may be utilized in combination with the gaming table video streams.

Input device 112 may be mechanical buttons, electronic buttons, mechanical switches, electronic switches, optical switches, a slot pull handle, a keyboard, a keypad, a touch screen, a gesture screen, a joystick, a pointing device (e.g., a mouse), a virtual (on-screen) keyboard, a virtual (on-screen) keypad, biometric sensor, or any combination thereof. Input device 112 may be utilized to verify one or more parameters relating to front-mounted display 512, front-mounted interface area 502, front-mounted support area 506, front-mounted locking device 508, one or more electrical attachment devices 902, one or more attachment areas 510, electronic gaming device 100, electronic gaming system 200, first display 602, wall of the display installation area 1104, back of the display installation area 1106, one or more front-mounted display interfaces 1108, one or more electrical attachment points 1109, an input area 1110, one or more input devices 1112, second display 604, front-mounted display screen 702, one or more alignment lines 616, 618, display interface locked area 1310, one or more electrical interconnection points 620, 630, one or more electrical wires 1306, one or more springs 1316, one or more motors 1314, one or more adjustable devices 1318, and/or one or more sensors 1312, to unlock one or more of front-mounted display 512, front-mounted interface area 502, front-mounted support area 506, front-mounted locking device 508, one or more electrical attachment devices 902, one or more attachment areas 510, electronic gaming device 100, electronic gaming system 200, first display 602, wall of the display installation area 1104, back of the display installation area 1106, one or more front-mounted display interfaces 1108, one or more electrical attachment points 1109, an input area 1110, one or more input devices 1112, second display 604, front-mounted display screen 702, one or more alignment lines 616, 618, display interface locked area 1310, one or more electrical interconnection points 620, 630, one or more electrical wires 1306, one or more springs 1316, one or more motors 1314, one or more adjustable devices 1318, and/or one or more sensors 1312, to make a wager, to control any object, to select one or more pattern gaming options, to obtain data relating to historical payouts, to select a row and/or column to move, to select a row area to move, to select a column area to move, to select a symbol (or image) to move, to modify electronic gaming device 100 (e.g., change sound level, configuration, font, language, etc.), to select a movie or song, to select live multi-media streams, to request services (e.g., drinks, slot attendant, manager, etc.), to select two-dimensional ("2D") game play, to select three-dimensional ("3D") game play, to select both two-dimensional and three-dimensional game play, to change the orientation of games in a three-dimensional space, to move a symbol (e.g., wild, multiplier, etc.), and/or any combination thereof. These selections may occur via any other input device (e.g., a touch screen, voice commands, etc.). Input device 112 may be any control panel.

Credit device 114 may be utilized to collect monies and distribute monies (e.g., cash, vouchers, etc.). Credit device 114 may interface with a mobile device to electronically transmit money and/or credits. Credit device 114 may interface with a player's card to exchange player points.

Device interface 116 may be utilized to interface electronic gaming device 100 to a bonus game device, a local area progressive controller, a wide area progressive controller, a progressive sign controller, a peripheral display device, signage, a promotional device, network components, a local network, a wide area network, remote access equipment, a slot monitoring system, a slot player tracking system, the Internet, a server, and/or any combination thereof.

Device interface 116 may be utilized to connect a player to electronic gaming device 100 through a mobile device, card, keypad, identification device 118, and/or any combination thereof. Device interface 116 may include a docking station by which a mobile device is plugged into electronic gaming machine 100. Device interface 116 may include an over the air connection by which a mobile device is connected to electronic gaming machine 100 (e.g., Bluetooth, Near Field technology, and/or Wi-Fi technology). Device interface 116 may include a connection to identification device 118.

Identification device 118 may be utilized to determine an identity of a player. Based on information obtained by identification device 118, electronic gaming device 100 may be reconfigured. For example, the language, sound level, music, placement of multi-media streams, one or more game functionalities (e.g., game type 1, game type 2, game type 3, etc.) may be presented, a repeat payline gaming option may be presented, a pattern gaming option may be presented, historical gaming data may be presented, a row rearrangement option may be presented, a column rearrangement option may be presented, a row area rearrangement option may be presented, a column area rearrangement option may be presented, a two-dimensional gaming option may be presented, a three-dimensional gaming option may be presented, and/or the placement of gaming options may be modified based on player preference data. For example, the player may only want to play games that include pattern gaming options only. Therefore, only games which include pattern gaming options would be presented to the player. In another example, the player may only want to play games that include historical information relating to game play. Therefore, only games which include historical gaming data would be presented to the player. These examples may be combined.

Identification device 118 may utilize biometrics (e.g., thumb print, retinal scan, or other biometric). Identification device 118 may include a card entry slot into input device 112. Identification device 118 may include a keypad with an assigned pin number for verification. Identification device 118 may include multiple layers of identification for added security. For example, a player could be required to enter a player tracking card, and/or a pin number, and/or a thumb print, and/or any combination thereof. Based on information obtained by identification device 118, electronic gaming device 100 may be reconfigured. For example, the language, sound level, music, placement of video streams, placement of images, and the placement of gaming options utilized may be modified based on a player's preference data. For example, a player may have selected baseball under the sporting event preferences; electronic gaming device 100 will then automatically display the current baseball game onto side display screen 108 and/or an alternate display screen as set in the player's options.

First display screen 102 may be a liquid crystal display ("LCD"), a cathode ray tube display ("CRT"), organic light-emitting diode display ("OLED"), plasma display panel ("PDP"), electroluminescent display ("ELD"), a light-emitting diode display ("LED"), or any other display technology. First display screen 102 may be used for displaying primary games or secondary (bonus) games, to display one or more warnings relating to front-mounted display 512, front-mounted interface area 502, front-mounted support area 506, front-mounted locking device 508, one or more electrical attachment devices 902, one or more attachment areas 510, electronic gaming device 100, electronic gaming system 200, first display 602, wall of the display installation area 1104, back of the display installation area 1106, one or more front-mounted display interfaces 1108, one or more electrical attachment points 1109, an input area 1110, one or more input devices 1112, second display 604, front-mounted display screen 702, one or more alignment lines 616, 618, display interface locked area 1310, one or more electrical interconnection points 620, 630, one or more electrical wires 1306, one or more springs 1316, one or more motors 1314, one or more adjustable devices 1318, and/or one or more sensors 1312, advertising, player attractions, electronic gaming device 100 configuration parameters and settings, game history, accounting meters, events, alarms, and/or any combination thereof. Second display screen 104, third display screen 106, side display screen 108, and any other screens may utilize the same technology as first display screen 102 and/or any combination of technologies.

First display screen 102 may also be virtually combined with second display screen 104. Likewise second display screen 104 may also be virtually combined with third display screen 106. First display screen 102 may be virtually combined with both second display screen 104 and third display screen 106. Any combination thereof may be formed.

For example, a single large image could be partially displayed on second display screen 104 and partially displayed on third display screen 106, so that when both display screens are put together they complete one image. Electronic gaming device 100 may stream or play prerecorded multimedia data, which may be displayed on any display combination.

Figure 2:
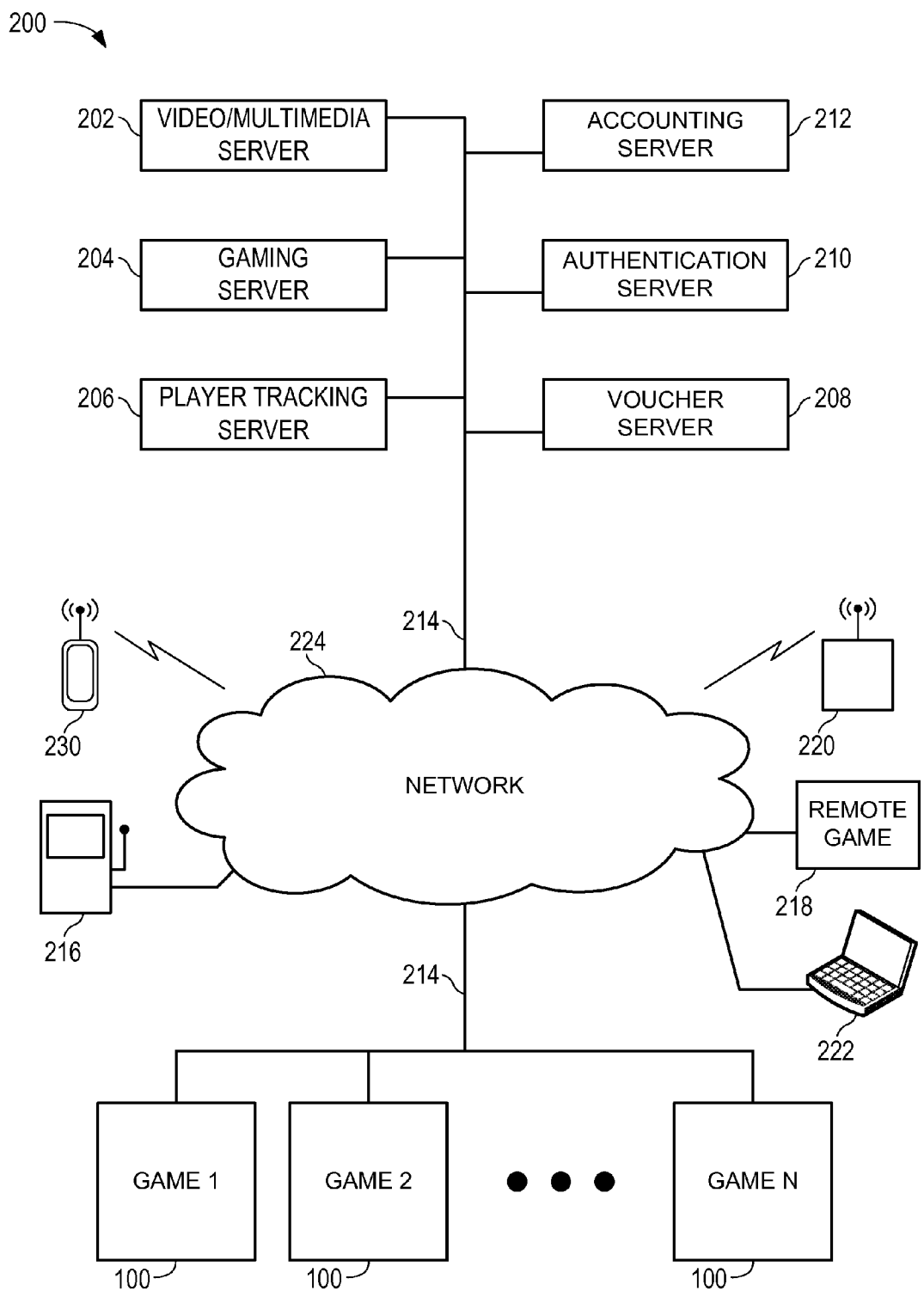
FIG. 2 is an illustration of an electronic gaming system, according to one embodiment.

In FIG. 2, an electronic gaming system 200 is shown. Electronic gaming system 200 may include a video/multimedia server 202, a gaming server 204, a player tracking server 206, a voucher server 208, an authentication server 210, and an accounting server 212.

Electronic gaming system 200 may include video/multimedia server 202, which may be coupled to network 224 via a network link 214. Network 224 may be the Internet, a private network, and/or a network cloud. One or more video streams may be received at video/multimedia server 202 from other electronic gaming devices 100. Video/multimedia server 202 may transmit one or more of these video streams to a mobile phone 230, electronic gaming device 100, a remote electronic gaming device at a different location in the same property 216, a remote electronic gaming device at a different location 218, a laptop 222, and/or any other remote electronic device 220. Video/multimedia server 202 may transmit these video streams via network link 214 and/or network 224.

For example, a remote gaming device at the same location may be utilized at a casino with multiple casino floors, a casino that allows wagering activities to take place from the hotel room, a casino that may allow wagering activities to take place from the pool area, etc. In another example, the remote devices may be at another location via a progressive link to another casino, and/or a link within a casino corporation that owns numerous casinos (e.g., MGM, Caesars, etc.).

Gaming server 204 may generate gaming outcomes. Gaming server 204 may provide electronic gaming device 100 with game play content. Gaming server 204 may provide electronic gaming device 100 with game play math and/or outcomes. Gaming server 204 may provide one or more of a payout functionality, a game play functionality, a game play evaluation functionality, other game functionality, and/or any other virtual game functionality.

Player tracking server 206 may track a player's betting activity, a player's preferences (e.g., language, font, sound level, drinks, etc.). Based on data obtained by player tracking server 206, a player may be eligible for gaming rewards (e.g., free play), promotions, and/or other awards (e.g., complimentary food, drinks, lodging, concerts, etc.).

Voucher server 208 may generate a voucher, which may include data relating to gaming. Further, the voucher may include payline structure option selections. In addition, the voucher may include game play data (or similar game play data), repeat payline data, pattern data, historical payout data, column data, row data, and/or symbols that were modified.

Authentication server 210 may determine the validity of vouchers, player's identity, and/or an outcome for a gaming event.

Accounting server 212 may compile, track, and/or monitor cash flows, voucher transactions, winning vouchers, losing vouchers, and/or other transaction data. Transaction data may include the number of wagers, the size of these wagers, the date and time for these wagers, the identity of the players making these wagers, and/or the frequency of the wagers. Accounting server 212 may generate tax information relating to these wagers. Accounting server 212 may generate profit/loss reports for players' tracked outcomes.

Network connection 214 may be used for communication between dedicated servers, thin clients, thick clients, back-office accounting systems, etc.

Laptop computer 222 and/or any other electronic devices (e.g., mobile phone 230, electronic gaming device 100, etc.) may be used for downloading new gaming device applications or gaming device related firmware through remote access.

Laptop computer 222 and/or any other electronic device (e.g., mobile phone 230, electronic gaming device 100, etc.) may be used for uploading accounting information (e.g., cashable credits, non-cashable credits, coin in, coin out, bill in, voucher in, voucher out, etc.).

Network 224 may be a local area network, a casino premises network, a wide area network, a virtual private network, an enterprise private network, the Internet, or any combination thereof. Hardware components, such as network interface cards, repeaters and hubs, bridges, switches, routers, firewalls, or any combination thereof may also be part of network 224.

A statistics server may be used to maintain data relating to historical game play for one or more electronic gaming devices 100. This historical data may include winning amounts, winning data (e.g., person, sex, age, time on machine, amount of spins before winning event occurred, etc.), fastest winning event reoccurrence, longest winning event reoccurrence, average frequencies of winning events, average winning amounts, highest winning amount, lowest winning amount, locations for winning events, winning event dates, winning machines, winning game themes, and/or any other data relating to game play.

Figure 3:
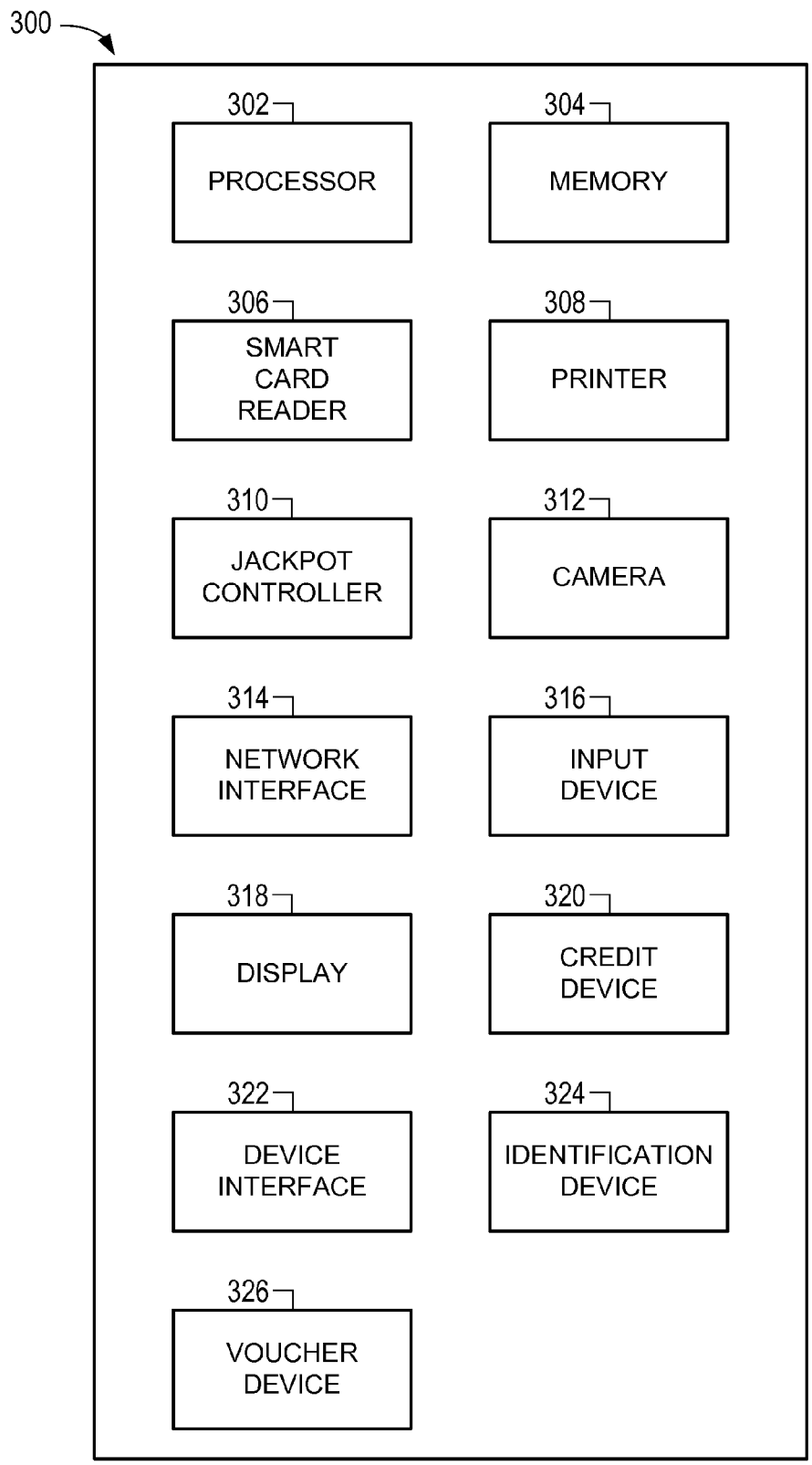
FIG. 3 is a block diagram of the electronic gaming device, according to one embodiment.

FIG. 3 shows a block diagram 300 of electronic gaming device 100. Electronic gaming device 100 may include a processor 302, a memory 304, a smart card reader 306, a printer 308, a jackpot controller 310, a camera 312, a network interface 314, an input device 316, a display 318, a credit device 320, a device interface 322, an identification device 324, and a voucher device 326.

Processor 302 may execute program instructions of memory 304 and use memory 304 for data storage. Processor 302 may also include a numeric co-processor, or a graphics processing unit (or units) for accelerated video encoding and decoding, and/or any combination thereof.

Processor 302 may include communication interfaces for communicating with electronic gaming device 100, electronic gaming system 200, and user interfaces to enable communication with all gaming elements. For example, processor 302 may interface with memory 304 to access a player's mobile device through device interface 322 to display contents onto display 318. Processor 302 may generate a voucher based on a wager confirmation, which may be received by an input device, a server, a mobile device, and/or any combination thereof. A voucher device may generate, print, transmit, or receive a voucher. Memory 304 may include communication interfaces for communicating with electronic gaming device 100, electronic gaming system 200, and user interfaces to enable communication with all gaming elements. For example, the information stored on memory 304 may be printed out onto a voucher by printer 308. Videos or pictures captured by camera 312 may be saved and stored on memory 304. Memory 304 may include a confirmation module, which may authenticate a value of a voucher and/or the validity of the voucher. Processor 302 may determine the value of the voucher based on generated voucher data and data in the confirmation module. Electronic gaming device 100 may include a player preference input device. The player preference input device may modify a game configuration. The modification may be based on data from the identification device.

Memory 304 may be non-volatile semiconductor memory, such as read-only memory ("ROM"), erasable programmable read-only memory ("EPROM"), electrically erasable programmable read-only memory ("EEPROM"), flash memory ("NVRAM"), Nano-RAM (e.g., carbon nanotube random access memory), and/or any combination thereof.

Memory 304 may also be volatile semiconductor memory such as, dynamic random access memory ("DRAM"), static random access memory ("SRAM"), and/or any combination thereof.

Memory 304 may also be a data storage device, such as a hard disk drive, an optical disk drive such as, CD, DVD, Blu-ray, a solid state drive, a memory stick, a CompactFlash card, a USB flash drive, a Multi-media Card, an xD-Picture Card, and/or any combination thereof.

Memory 304 may be used to store read-only program instructions for execution by processor 302, for the read-write storage for global variables and static variables, read-write storage for uninitialized data, read-write storage for dynamically allocated memory, for the read-write storage of the data structure known as "the stack," and/or any combination thereof.

Memory 304 may be used to store the read-only paytable information for which symbol combinations on a given payline that result in a win (e.g., payout) which are established for games of chance, such as slot games and video poker.

Memory 304 may be used to store accounting information (e.g., cashable electronic promotion in, non-cashable electronic promotion out, coin in, coin out, bill in, voucher in, voucher out, electronic funds transfer in, etc.).

Memory 304 may be used to record error conditions on an electronic gaming device 100, such as door open, coin jam, ticket print failure, ticket (e.g., paper) jam, program error, reel tilt, etc., and/or any combination thereof.

Memory 304 may also be used to record the complete history for the most recent game played, plus some number of prior games as may be determined by the regulating authority.

Smart card reader 306 may allow electronic gaming device 100 to access and read information provided by the player or technician, which may be used for setting the player preferences and/or providing maintenance information. For example, smart card reader 306 may provide an interface between a smart card (inserted by the player) and identification device 324 to verify the identity of a player.

Printer 308 may be used for printing slot machine payout receipts, slot machine wagering vouchers, non-gaming coupons, slot machine coupons (e.g., a wagering instrument with a fixed waging value that can only be used for non-cashable credits), drink tokens, comps, and/or any combination thereof.

Electronic gaming device 100 may include a jackpot controller 310, which may allow electronic gaming device 100 to interface with other electronic gaming devices either directly or through electronic gaming system 200 to accumulate a shared jackpot.

Camera 312 may allow electronic gaming device 100 to take images of a player or a player's surroundings. For example, when a player sits down at the machine their picture may be taken to include his or her image into the game play. A picture of a player may be an actual image as taken by camera 312. A picture of a player may be a computerized caricature of the image taken by camera 312. The image obtained by camera 312 may be used in connection with identification device 324 using facial recognition. Camera 312 may allow electronic gaming device 100 to record video. The video may be stored on memory 304 or stored remotely via electronic gaming system 200. Videos obtained by camera 312 may then be used as part of game play, or may be used for security purposes. For example, a camera located on electronic gaming device 100 may capture videos of a potential illegal activity (e.g., tampering with the machine, crime in the vicinity, underage players, etc.).

Network interface 314 may allow electronic gaming device 100 to communicate with video/multimedia server 202, gaming server 204, player tracking server 206, voucher server 208, authentication server 210, and/or accounting server 212.

Input device 316 may be mechanical buttons, electronic buttons, a touch screen, and/or any combination thereof. Input device 316 may be utilized to make a wager, to select one or more game elements, to select one or more gaming options, to make an offer to buy or sell a voucher, to determine a voucher's worth, to cash in a voucher, to modify electronic gaming device 100 (e.g., change sound level, configuration, font, language, etc.), to modify one of front-mounted display 512, front-mounted interface area 502, front-mounted support area 506, front-mounted locking device 508, one or more electrical attachment devices 902, one or more attachment areas 510, electronic gaming device 100, electronic gaming system 200, first display 602, wall of the display installation area 1104, back of the display installation area 1106, one or more front-mounted display interfaces 1108, one or more electrical attachment points 1109, an input area 1110, one or more input devices 1112, second display 604, front-mounted display screen 702, one or more alignment lines 616, 618, display interface locked area 1310, one or more electrical interconnection points 620, 630, one or more electrical wires 1306, one or more springs 1316, one or more motors 1314, one or more adjustable devices 1318, and/or one or more sensors 1312, to select a movie or music, to select live video streams (e.g., sporting event 1, sporting event 2, sporting event 3), to request services (e.g., drinks, manager, etc.), and/or any combination thereof.

Display 318 may show video streams from one or more content sources. Display 318 may encompass first display screen 102, second display screen 104, third display screen 106, side display screen 108, and/or another screen used for displaying video content.

Credit device 320 may be utilized to collect monies and distribute monies (e.g., cash, vouchers, etc.). Credit device 320 may interface with processor 302 to allow game play to take place. Processor 302 may determine any payouts, display configurations, animation, and/or any other functions associated with game play. Credit device 320 may interface with display 318 to display the amount of available credits for the player to use for wagering purposes. Credit device 320 may interface via device interface 322 with a mobile device to electronically transmit money and/or credits. Credit device 320 may interface with a player's pre-established account, which may be stored on electronic gaming system 200, to electronically transmit money and/or credit. For example, a player may have a credit card or other mag-stripe card on file with the location for which money and/or credits can be directly applied when the player is done. Credit device 320 may interface with a player's card to exchange player points.

Electronic gaming device 100 may include a device interface 322 that a user may employ with his or her mobile device (e.g., smart phone) to receive information from and/or transmit information to electronic gaming device 100 (e.g., watch a movie, listen to music, obtain verbal betting options, verify identification, transmit credits, etc.).

Identification device 324 may be utilized to allow electronic gaming device 100 to determine an identity of a player. Based on information obtained by identification device 324, electronic gaming device 100 may be reconfigured. For example, the language, sound level, music, placement of video streams, placement of images, placement of gaming options, and/or the tables utilized may be modified based on player preference data.

For example, a player may have selected a specific baseball team (e.g., Atlanta Braves) under the sporting event preferences, the electronic gaming device 100 will then automatically (or via player input) display the current baseball game (e.g., Atlanta Braves vs. Philadelphia Phillies) onto side display screen 108 and/or an alternate display screen as set in the player's options.

A voucher device 326 may generate, print, transmit, or receive a voucher. The voucher may represent a wagering option, a wagering structure, a wagering timeline, a value of wager, a payout potential, a payout, and/or any other wagering data. A voucher may represent an award, which may be used at other locations inside of the gaming establishment. For example, the voucher may be a coupon for the local buffet or a concert ticket.

FIG. 4 shows a block diagram of memory 304, which includes various modules. Memory 304 may include a validation module 402, a voucher module 404, a reporting module 406, a maintenance module 408, a player tracking preferences module 410, an evaluation module 412, a payout module 414, a bonus module 416, an installation verification module 418, and a locking module 420.

Validation module 402 may utilize data received from voucher device 326 to confirm the validity of the voucher.

Voucher module 404 may store data relating to generated vouchers, redeemed vouchers, bought vouchers, and/or sold vouchers.

Reporting module 406 may generate reports related to a performance of electronic gaming device 100, electronic gaming system 200, video streams, gaming objects, credit device 114, and/or identification device 118.

Maintenance module 408 may track any maintenance that is implemented on electronic gaming device 100 and/or electronic gaming system 200. Maintenance module 408 may schedule preventative maintenance and/or request a service call based on a device error.

Player tracking preferences module 410 may compile and track data associated with a player's preferences.

Evaluation module 412 may evaluate one or more outcomes for one or more events relating to game play.

Payout module 414 may determine one or more payouts which may relate to one or more inputs received from the player, electronic gaming device 100, and/or electronic gaming system 200.

Bonus module 416 may generate a bonus game, evaluate the results of the bonus game, trigger bonus game presentations, generate bonus game payouts, and/or display any data relating to the bonus game.

Installation verification module 418 may verify the installation parameters on one or more of front-mounted display 512, front-mounted interface area 502, front-mounted support area 506, front-mounted locking device 508, one or more electrical attachment devices 902, one or more attachment areas 510, electronic gaming device 100, electronic gaming system 200, first display 602, wall of the display installation area 1104, back of the display installation area 1106, one or more front-mounted display interfaces 1108, one or more electrical attachment points 1109, an input area 1110, one or more input devices 1112, second display 604, front-mounted display screen 702, one or more alignment lines 616, 618, display interface locked area 1310, one or more electrical interconnection points 620, 630, one or more electrical wires 1306, one or more springs 1316, one or more motors 1314, one or more adjustable devices 1318, and/or one or more sensors 1312. Installation verification module 418 may generate, store, and/or transmit a warning based on comparing data received from one or more sensors relating to one or more of front-mounted display 512, front-mounted interface area 502, front-mounted support area 506, front-mounted locking device 508, one or more electrical attachment devices 902, one or more attachment areas 510, electronic gaming device 100, electronic gaming system 200, first display 602, wall of the display installation area 1104, back of the display installation area 1106, one or more front-mounted display interfaces 1108, one or more electrical attachment points 1109, an input area 1110, one or more input devices 1112, second display 604, front-mounted display screen 702, one or more alignment lines 616, 618, display interface locked area 1310, one or more electrical interconnection points 620, 630, one or more electrical wires 1306, one or more springs 1316, one or more motors 1314, one or more adjustable devices 1318, and/or one or more sensors 1312 to one or more reference data points. These warnings may be transmitted to an external device, a server, a mobile device, and/or a warning display on electronic gaming device 100.

Locking module 420 may control the locking mechanism for one or more of front-mounted display 512, front-mounted interface area 502, front-mounted support area 506, front-mounted locking device 508, one or more electrical attachment devices 902, one or more attachment areas 510, electronic gaming device 100, electronic gaming system 200, first display 602, wall of the display installation area 1104, back of the display installation area 1106, one or more front-mounted display interfaces 1108, one or more electrical attachment points 1109, an input area 1110, one or more input devices 1112, second display 604, front-mounted display screen 702, one or more alignment lines 616, 618, display interface locked area 1310, one or more electrical interconnection points 620, 630, one or more electrical wires 1306, one or more springs 1316, one or more motors 1314, one or more adjustable devices 1318, and/or one or more sensors 1312. Locking module 420 may control any locking mechanism for electronic gaming device 100. Locking module 420 may generate a warning when a locking data point is outside of a specific parameter. These warnings may be transmitted to an external device, a server, a mobile device, and/or a warning display on electronic gaming device 100.

Locking module 420 may control the locking mechanism for one or more of front-mounted display 512, front-mounted interface area 502, front-mounted support area 506, front-mounted locking device 508, one or more electrical attachment devices 902, one or more attachment areas 510, electronic gaming device 100, electronic gaming system 200, first display 602, wall of the display installation area 1104, back of the display installation area 1106, one or more front-mounted display interfaces 1108, one or more electrical attachment points 1109, an input area 1110, one or more input devices 1112, second display 604, front-mounted display screen 702, one or more alignment lines 616, 618, display interface locked area 1204, one or more electrical interconnection points 620, 630, one or more electrical wires 1306, one or more springs 1316, one or more motors 1314, one or more adjustable devices 1318, and/or one or more sensors 1312. Locking module 420 may control any locking mechanism for electronic gaming device 100. Locking module 420 may generate a warning when a locking data point is outside of a specific parameter. These warnings may be transmitted to an external device, a server, a mobile device, and/or a warning display on electronic gaming device 100.

It should be noted that one or more modules may be combined into one module. Further, there may be one evaluation module where the determined payout does not depend on whether there were any wild symbols, scatter symbols, platform based game play, and/or any other specific symbols. Further, any module, device, and/or logic function in electronic gaming device 100 may be present in electronic gaming system 200. In addition, any module, device, and/or logic function in electronic gaming system 200 may be present in electronic gaming device 100.

In FIG. 5A, an illustration of the front-mounted display 500 is shown, according to one embodiment. A front-mounted display 512 may include a front-mounted display screen 514, front-mounted device, and/or one or more electrical attachment devices 904, 906, 1002, 1308, and 1408 (see FIGS. 9A, 9B, 10, 13, and 14). Front-mounted device 512 may include one or more attachment areas 513 and/or one or more electrical attachment devices 904, 906, 1002, 1308, and 1408 (see FIGS. 9A, 9B, 10, 13, and 14).

One or more attachment areas 513 may be utilized to connect front-mounted interface area 502 to front-mounted display 512. One or more attachment areas 513 may be connected via screws, nuts, bolts, glue, and/or any other securing means. One or more electrical attachment devices 904 (electrical attachment areas) may be utilized to electrically connect front-mounted interface area 502 to front-mounted display 512.

Figure 11:
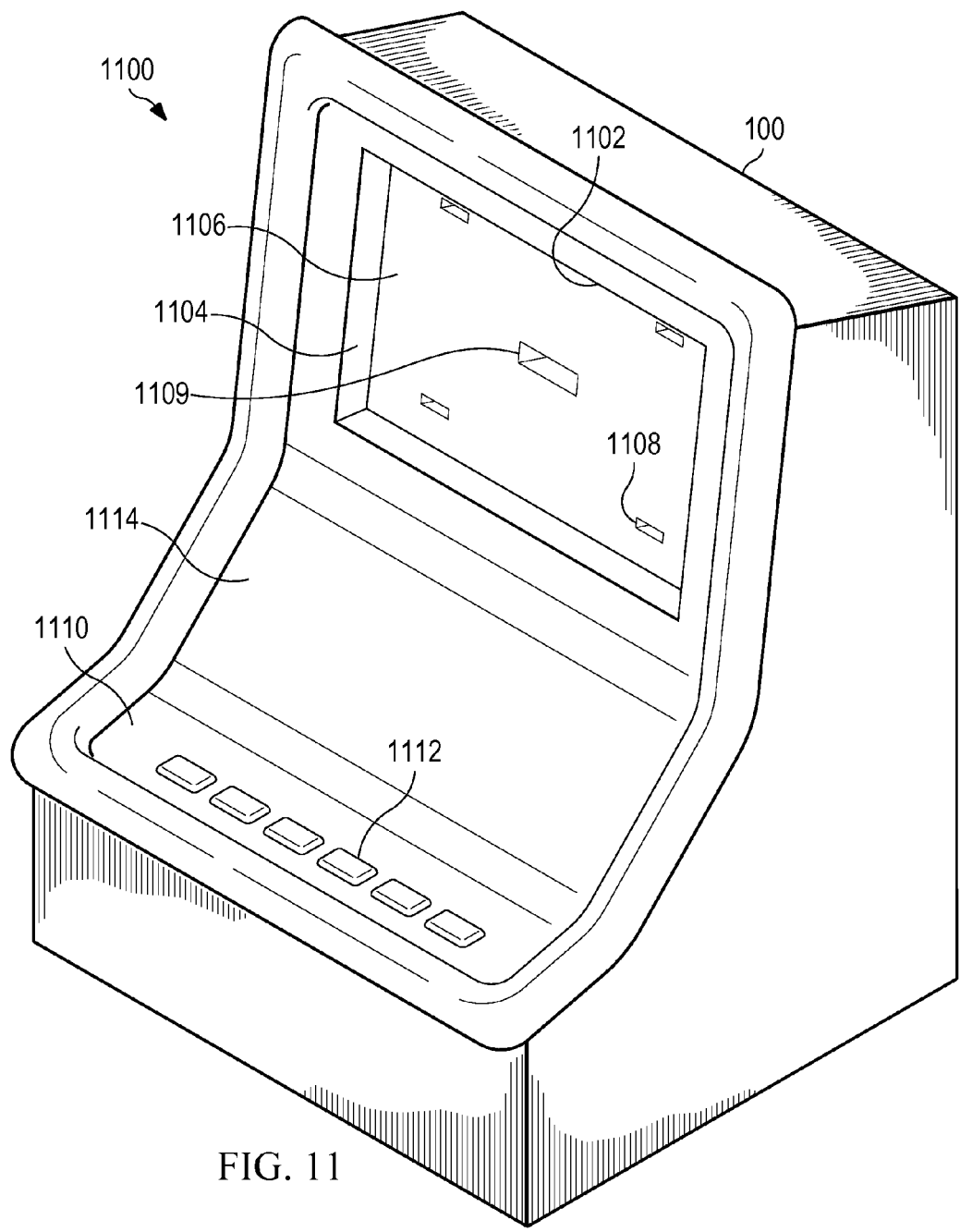
FIG. 11 is another illustration of the front-mounted locking mechanism, according to one embodiment.

One or more electrical attachment devices 1308 may be utilized to electrically connect front-mounted display 512 to electronic gaming device 100, electronic gaming system 200, a wall of the display installation area 1104, a back of the display installation area 1106, one or more front-mounted display interfaces 1108, and/or one or more electrical attachment points 1109 (see FIG. 11).

Front-mounted locking device 1004, 1006, 1008, and 1010 may be connected to electronic gaming device 100 via an interface. Front-mounted locking device 1004, 1006, 1008, and 1010 may be connected to electronic gaming device 100 without an interface. Front-mounted locking device 1004, 1006, 1008, and 1010 may be connected by applying pressure to one or more front-mounted locking devices. In one example, the compression of one or more front-mounted locking devices may lock the one or more front-mounted locking devices into place. In this example, the locking device is then passed through an attachment opening. Once front-mounted locking device has passed through the attachment opening, the pressure is released from front-mounted locking device which then opens back up and is locked in place. In another example, the one or more front-mounted locking devices may be locked via screws, nuts, bolts, glue, and/or any other securing means.

In one example, front-mounted support area may compress front-mounted locking device, which allows front-mounted locking device to be unlocked from one or more connected devices.

In one example, one or more attachment areas 513 may be utilized to connect front-mounted interface area 502 to front-mounted display 512. In this example, one or more attachment areas 513 may be connect to front-mounted interface area 502 via one or more front-mounted locking device 508. One or more attachment areas 510 (e.g., locking areas) may be utilized to connect one or more attachment areas 513 to one or more front-mounted locking device 508. In one example, an interface substrate 504 may be a buffer surface between a front-mounted support structure 506, front-mounted interface area 502, and/or front-mounted display 512 (see FIG. 5B). It should be noted that this attachment may create a flush surface between front-mounted interface area 502, front-mounted display 512, and/or front-mounted display screen 514.

Figure 6:
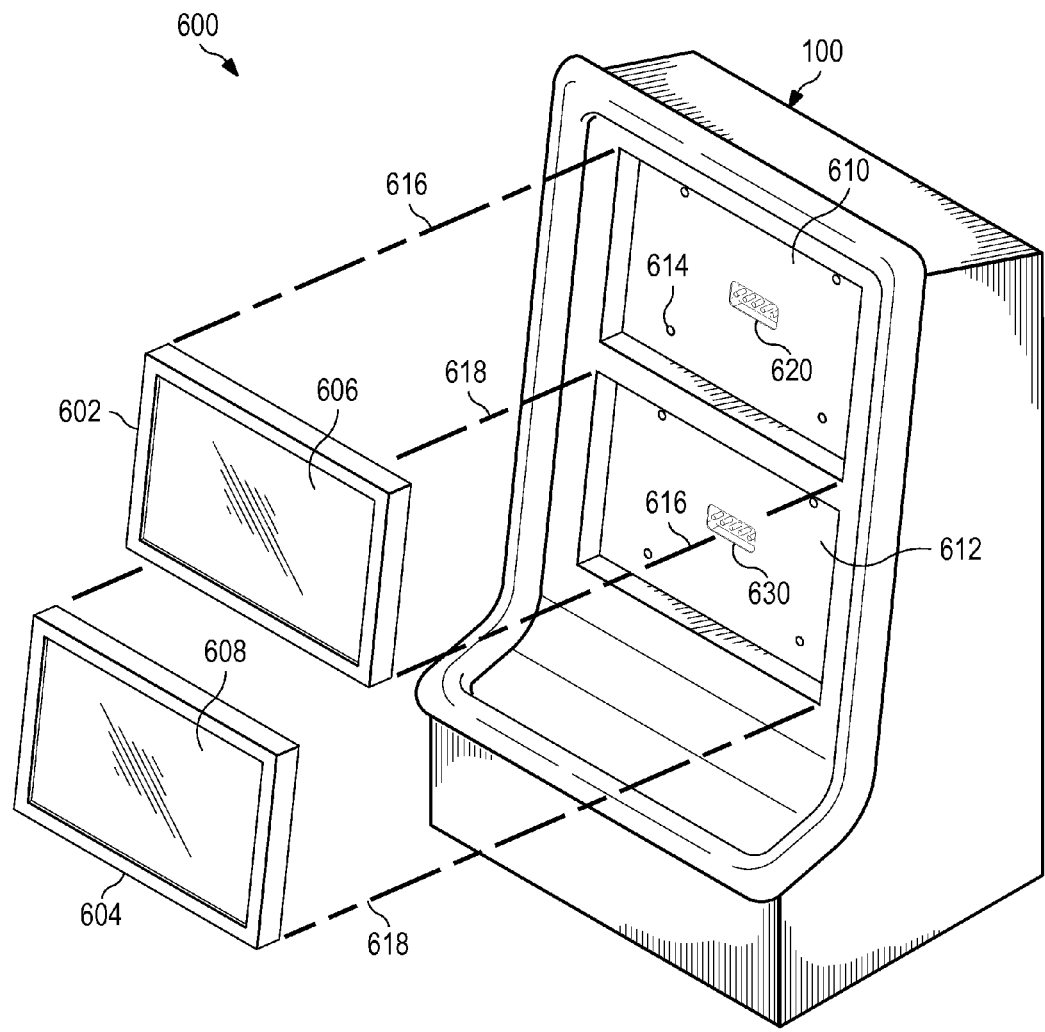
FIG. 6 is an illustration of the display interface in the electronic gaming machine for the front-mounted display, according to one embodiment.

FIG. 6 is an illustration of the interface in the electronic gaming machine for the front-mounted display, according to one embodiment. A first image 600 may include electronic gaming device 100, first display 602, second display 604, one or more alignment lines 616, 618, a first display interface area 610, a second display interface area 612, one or more electrical interconnection points 620 (e.g., a first display electrical connection area), a second display electrical connection area 630, and one or more interconnection areas 614. First display 602 may include a first display area 606. Second display 604 may include a front-mounted display interface 608 (e.g., second display area). In one example, first image 600 may further include wall of the display installation area 1104, back of the display installation area 1106, one or more front-mounted display interfaces 1108, one or more electrical attachment points 1109, an input area 1110, and/or one or more input devices 1112 (see FIG. 11).

One or more electrical attachment points 1109 may be utilized to electrically connect front-mounted display 512 to electronic gaming device 100, electronic gaming system 200, first display 602, second display 604, wall of the display installation area 1104, back of the display installation area 1106, one or more front-mounted display interfaces 1108, one or more electrical attachment devices 902 and/or any other electrical device.

In one example, first display 602 and/or second display 604 are one or more front-mounted display to be installed. In another example, wall of the display installation area 1104 may have the same depth as one or more front-mounted displays to create one or more flush surfaces (see FIGS. 5A, 5B, 8A, 8B, 9A, and 9B). Back of the display installation area 1106 may be where front-mounted display 512 is supported. Back of the display installation area 1106 may include one or more front-mounted display interfaces 1108. One or more front-mounted display interfaces 1108 may allow for front-mounted interface area 502 to be located/positioned within the front-mounted display interface 608 to form a connection between front-mounted display 512, front-mounted interface area 502, front-mounted interface 608, back of the display installation area 1106, one or more electrical attachment devices 902, and/or one or more electrical attachment points 1109.

In one example, first display 602 via one or more alignment lines 616, 618 may be connected by one or more interconnection areas 614 to one or more attachment areas 513 and/or first display 602 via one or more electrical interconnection points 620 (e.g., a first display electrical connection area) may be electrically connected one or more electrical attachment devices 904, 906, 1002, 1308, and 1408.

In another example, second display 604 via one or more alignment lines 616, 618 may be connected by one or more interconnection areas 614 to one or more attachment areas 513 and/or second display 604 via second display electrical connection area 630 may be electrically connected one or more electrical attachment devices 904, 906, 1002, 1308, and 1408.

A person via a hand may utilize one or more alignment lines 616, 618 (or other alignment procedures) to place front-mounted display 512 via front-mounted interface area 502 into one or more front-mounted display interfaces 1108 (see FIGS. 6 and 11). Further, one or more alignment lines 616, 618 are imagery lines to demonstrate the plane for installation. In another example, a machine may utilize one or more alignment lines 616, 618 to place front-mounted display 512 via front-mounted interface area 502 into one or more front-mounted display interfaces 1108 (see FIGS. 6 and 11).

A person via a hand may utilize one or more alignment lines 616, 618 (or other alignment procedures) to connect one or more electrical attachment points 1109 on first display 602 to one or more electrical attachment devices 902 on front-mounted display 512. In another example, a machine may utilize one or more alignment lines 616, 618 to connect one or more electrical attachment points 1109 on first display 602 to one or more electrical attachment devices 902 on front-mounted display 512.

One or more electrical attachment points 1109 may be utilized to electrically connect front-mounted display 512 to electronic gaming device 100, electronic gaming system 200, first display 602, wall of the display installation area 1104, back of the display installation area 1106, one or more front-mounted display interfaces 1108, and/or one or more electrical attachment devices 902.

In FIGS. 7A and 7B, another illustration of the interface in the electronic gaming machine for the front-mounted display is shown, according to one embodiment. In FIG. 7A, one or more attachment areas 513 may be utilized to connect front-mounted interface area 502 to a front-mounted display screen 702. In this example, one or more attachment areas 513 may be connect to front-mounted display interconnection area 502 via one or more front-mounted locking device 508. One or more attachment areas 510 (e.g., locking areas) may be utilized to connect one or more attachment areas 513 to one or more front-mounted locking device 508. In this example, an interconnecting area 706 may be a hollow area where front-mounted display screen 702 may sit in. Front-mounted display screen 702 may include a curved display screen 704. Once front-mounted display screen 702 is connected to front-mounted interface area 502 as curved surface may be formed (see FIG. 7B).

In FIGS. 8A and 8B, another illustration of the interface in the electronic gaming machine for the front-mounted display is shown, according to one embodiment. In FIG. 8A, one or more attachment areas 513 may be utilized to connect front-mounted interface area 502 to a front-mounted display 802. In this example, one or more attachment areas 513 may be connect to front-mounted interface area 502 via one or more front-mounted locking device 508. One or more attachment areas 510 (e.g., locking areas) may be utilized to connect one or more attachment areas 513 to one or more front-mounted locking device 508. In this example, an interconnecting area 803 may be a hollow area where front-mounted display 802 may sit in. Front-mounted display 802 may include a flat display screen 804. Once front-mounted display 802 is connected to front-mounted interface area 502, a flat (e.g., flush) surface may be formed (see FIG. 8B).

In FIGS. 9A and 9B, another illustration of the interface in the electronic gaming machine for the front-mounted display is shown, according to one embodiment. In FIG. 9A, one or more attachment areas 513 may be utilized to connect front-mounted interface area 502 to an electrically connectable front-mounted display 512A. In this example, one or more attachment areas 513 may be connect to front-mounted interface area 502 via one or more front-mounted locking device 508. One or more attachment areas 510 (e.g., locking areas) may be utilized to connect one or more attachment areas 513 to one or more front-mounted locking device 508. In this example, an interconnecting area 903 may be an area where electrically connectable front-mounted display 512A may sit in. Electrically connectable front-mounted display 512A may include a flat display screen 514. Once electrically connectable front-mounted display 512A is connected to front-mounted interface area 502, a flat (e.g., flush) surface may be formed (see FIG. 9B). In another example, one or more electrical attachment devices 902 (e.g., one or more display electrical connection areas) may be electrically connected to one or more device electrical connection devices 904 to form an electrical connection 906. The one or more device electrical connection areas 904 may be located in front-mounted interface area 502.

Figure 10:
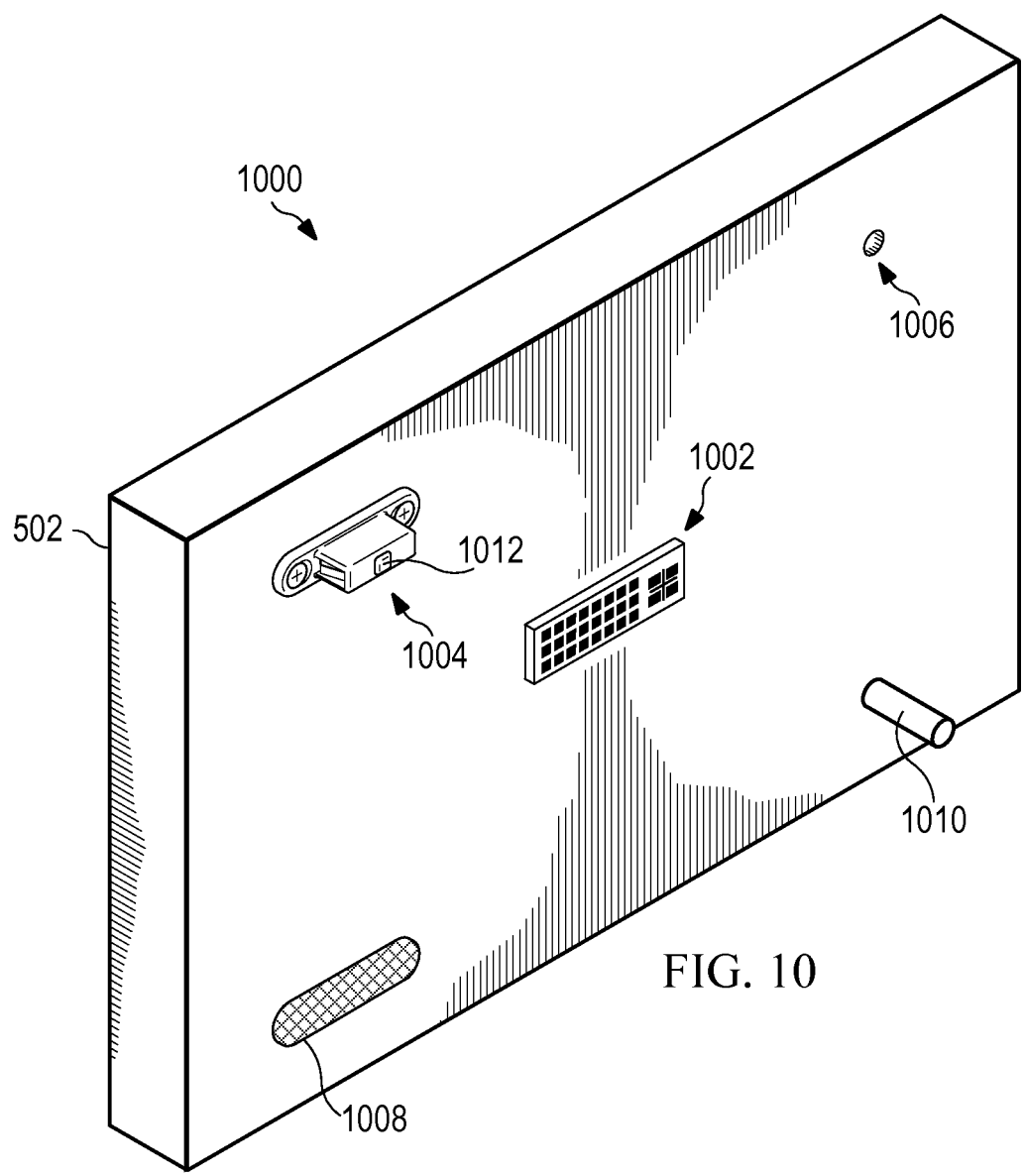
FIG. 10 shows various illustrations of locking mechanisms for the front-mounted display, according to various embodiments.

In FIG. 10, a front-mounted display image 1000 may include front-mounted display 502. Front-mounted interface area 502 may include a front-mounted locking device 1004 (e.g., a first connection device), a second connection device 1006, a third connection device 1008, a front-mounted locking device 1010 (e.g., a fourth connection device), and one or more electrical connection devices 1002. In one example, front-mounted locking device 1004 may be a snap-and-click locking device with an unlocking device 1012. This device may be connected by applying pressure to one or more front-mounted locking devices. In one example, the compression of one or more front-mounted locking devices may lock the one or more front-mounted locking devices into place. In this example, the locking device is then passed through an attachment opening. Once front-mounted locking device has passed through the attachment opening, the pressure is released from front-mounted locking device which then opens back up and is locked in place.

In another example, second connection device 1006 may be a hole, a screw interface, and/or any other female/male connection point. In one example, third connection device 1008 may be Velcro, glue, and/or any other chemical/mechanical connection mechanism. In one example, front-mounted locking device 1010 may be a male connection point. In an example, one or more electrical connection devices 1002 may be any type of electrical connection technology.

Figure 14:
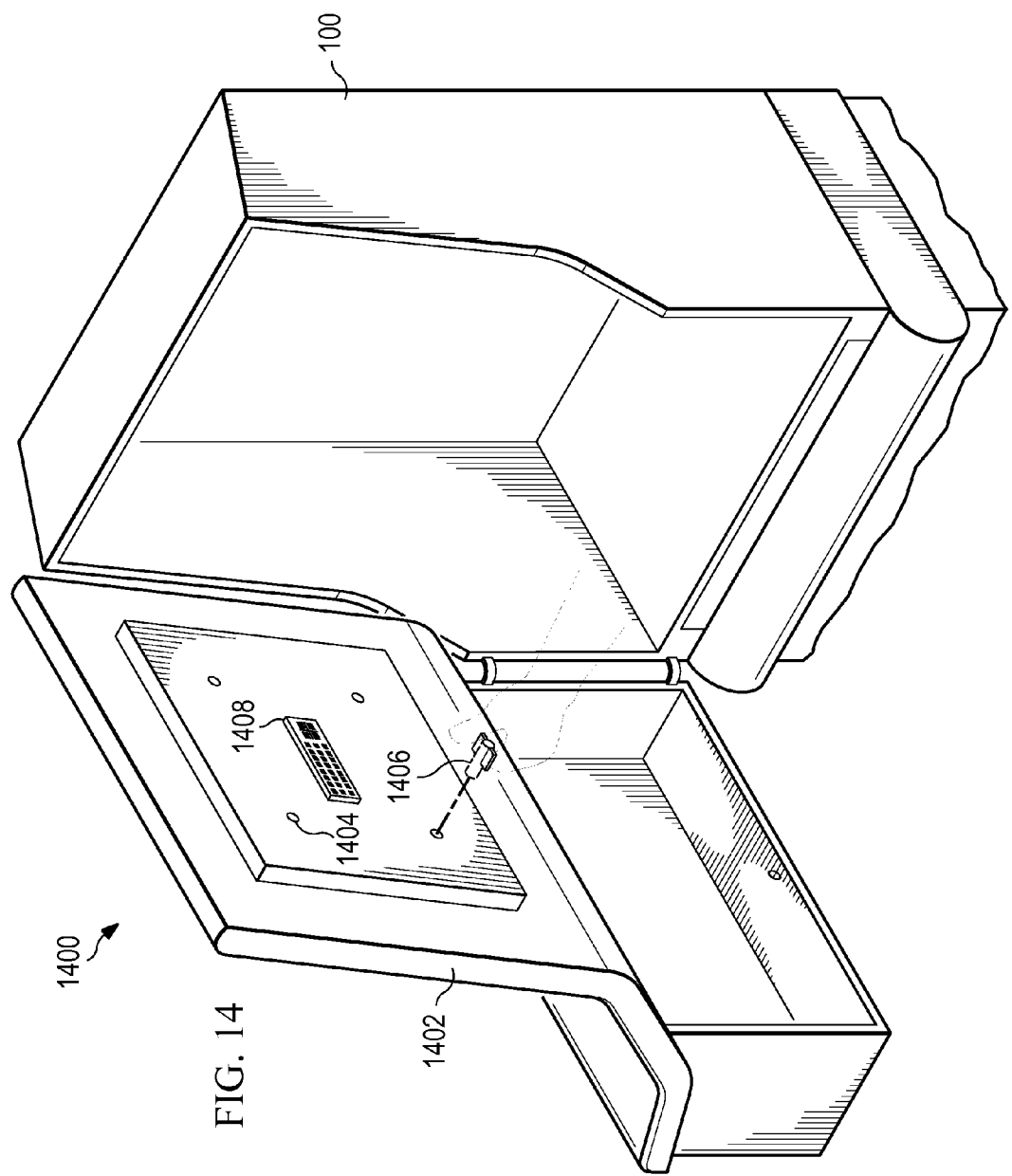
FIG. 14 is an illustration of an unlocking mechanism, according to one embodiment.

FIG. 11 is an illustration of the interface in the electronic gaming machine for the snap-and-click display, according to one embodiment. A first image 1100 may include electronic gaming device 100, display installation area 1102, wall of the display installation area 1104, back of the display installation area 1106, one or more display interfaces 1108, one or more electrical attachment points 1109, input area 1110, and one or more input devices 1112. As illustrated, the installation area 1102 may comprise a sunken or recessed area in the gaming machine (such as in the door thereof as illustrated in FIG. 14). The back 1106 may comprise a back or bottom of the sunken area. The wall 1104 may comprise a side wall which, as illustrated in FIG. 11, may have a first, a second, a third and a fourth sidewall (so that the sunken area is generally rectangular, to match the shape of a display which is to be located therein).

One or more electrical attachment points 1109 may be utilized to electrically connect front-mounted interface area 502 to electronic gaming device 100, electronic gaming system 200, display installation area 1102, wall of the display installation area 1104, back of the display installation area 1106, one or more front-mounted display interfaces 1108, one or more electrical attachment points 1109 (and/or devices) and/or any other electrical device.

In one example, display installation area 1102 is where front-mounted interface area 502 is installed. In another example, wall of the display installation area 1104 may have the same depth as front-mounted interface area 502 to create a flush surface. Back of the display installation area 1106 may be where front-mounted interface area 502 is supported. Back of the display installation area 1106 may include one or more front-mounted display interfaces 1108. One or more display interfaces 1108 may allow for interface substrate 504 to be located/positioned within the one or more front-mounted display interfaces 1108 to form a connection between front-mounted interface area 502, interface substrate 504, the one or more front-mounted display interfaces 1108, back of the display installation area 1106, one or more electrical attachment points 1109, and/or one or more electrical attachment points on front-mounted interface area 502.

Figure 12:
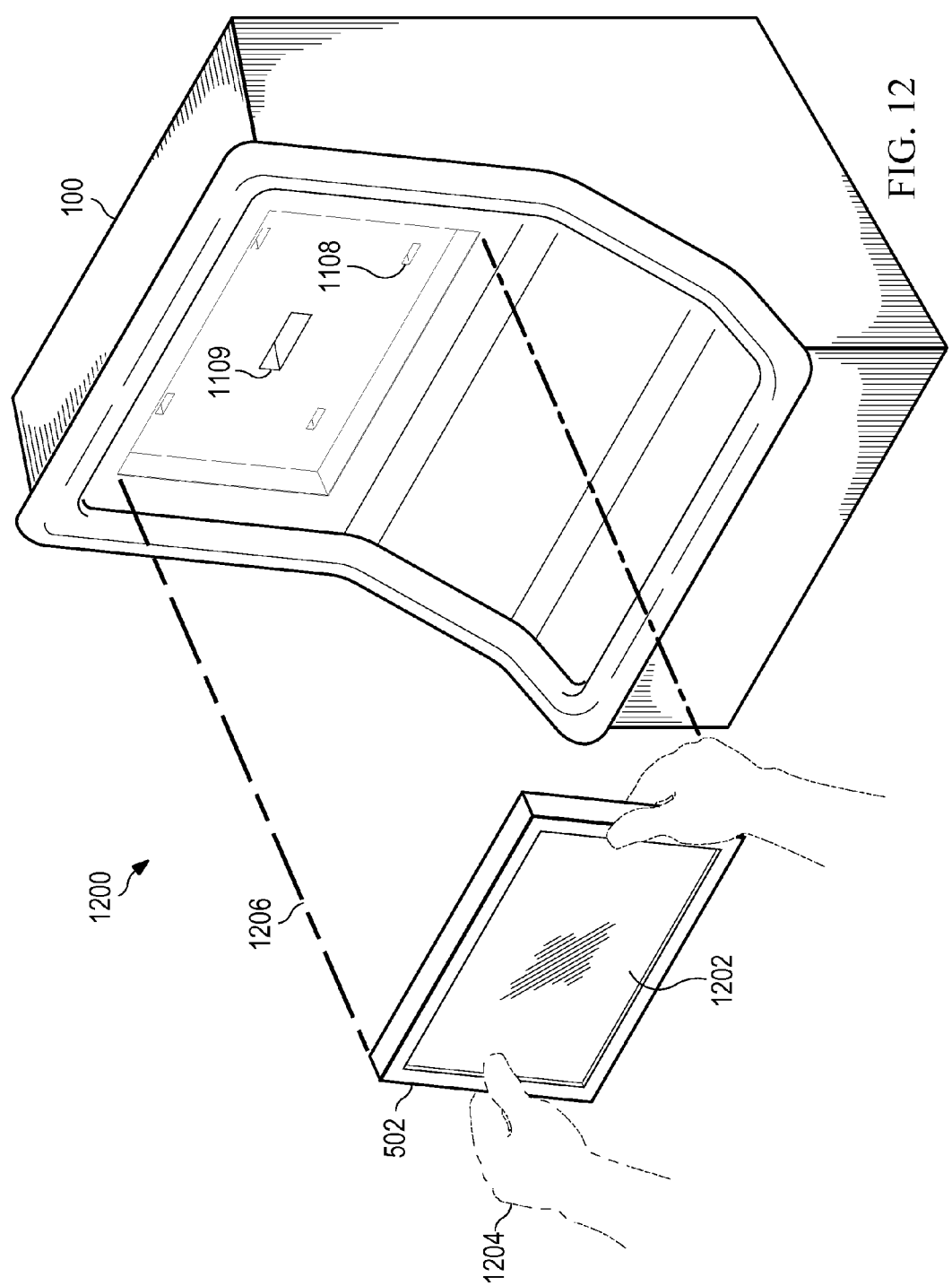
FIG. 12 is an illustration of a locking mechanism for display, display interface, an electrical connection mechanism, and the front-mounted locking mechanism combination, according to one embodiment.

FIG. 12 shows an illustration of a front-mounted display 1200, according to one embodiment. In one example, a person via a hand 1204 may move front-mounted display 502 along one or more alignment lines 1206 into one or more electrical attachment points 1109 and/or one or more attachment areas 1108 to electrically connect and/or physically connect front-mounted interface area 502 to electrical gaming device 100. In another example, a machine may move front-mounted interface area 502 along one or more alignment lines 1206 into one or more electrical attachment points 1109 and/or one or more front-mounted display interfaces 1108 to electrically connect and/or physically connect front-mounted interface area 502 to electrical gaming device 100.

In another example, front-mounted interface area may include one or more locking areas, front-mounted locking device, and front-mounted support area. One or more locking areas may allow a screw, a blot, a nut, and/or any other securing device to be inserted into one or more locking areas to secure front-mounted interface area to front-mounted display.

In another example, front-mounted support area may be utilized (e.g., by touching and/or pressing down) to unlock (e.g., place in a compressed position) front-mounted locking device.

Figure 13:
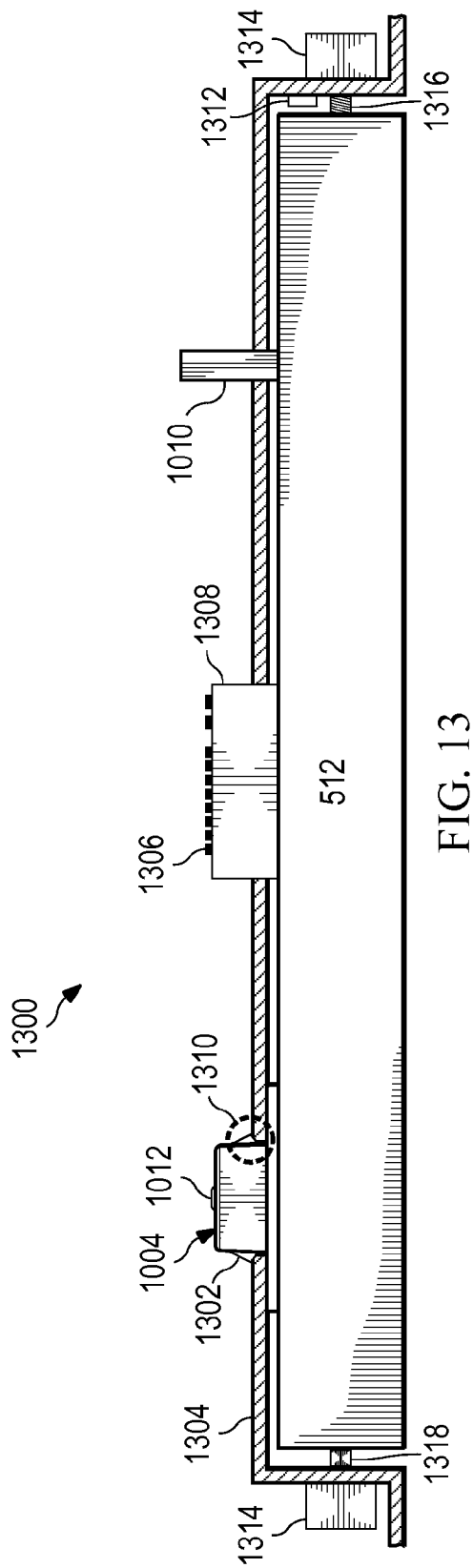
FIG. 13 is another illustration of a locking mechanism for display, display interface, an electrical connection mechanism, and the front-mounted locking mechanism combination, according to one embodiment.

FIG. 13 is an illustration of a locking mechanism for display, display interface, an electrical connection mechanism, and the front-mounted locking mechanism combination, according to one embodiment. A third image 1300 may include a display interface 1304, front-mounted interface area, a first front-mounted locking device 1004, front-mounted locking device 1010 (second front-mounted locking device), front-mounted support area, a display interface locked area 1310, one or more electrical interconnection points 1308 (e.g., a combination of one or more electrical attachment points 1109 and one or more electrical attachment devices 902), one or more electrical wires 1306, one or more springs 1316, one or more motors 1314, one or more adjustable devices 1318, and one or more sensors 1312. In one example, display interface locked area 1310 shows that front-mounted locking device has passed over (through) display interface, which compressed (e.g., puts in an open position) front-mounted locking device. Once front-mounted locking device went through display interface, then front-mounted locking device opened up (e.g., put in a closed position) to securely attach front-mounted locking device to display interface which can be seen in locking area.

One or more electrical interconnection points 1308 may be a combination of one or more electrical attachment points 1109 and one or more electrical attachment devices 902. One or more electrical wires 1306 may be any items which can carry electrical energy and/or data.

One or more biasing members such as springs 1316 may be utilized to manually and/or automatically (e.g., via one or more motors 1314) adjust front-mounted display 512 to a flush position with the outside of electronic gaming device 100, to a predetermined position, to a floating position, and/or any combination thereof. The flush position may allow front-mounted display 512 to appear level with the outside of electronic gaming device 100, which gives a high-tech feel to electronic gaming device 100. The predetermined position may be any position (e.g., flush, floating, within one-half of an inch from a flush position with electronic gaming device 100). The floating position may allow for reduced breakage of front-mounted display 512 when a force is applied to any part of electronic gaming device 100. For example, when the door of electronic gaming device 100 is being closed. The positions of front-mounted display 512 may be adjusted based on a mode of operation. For example, during installation and repair the floating position may be utilized to minimize breakage of front-mounted display 512. In another example, during a cleaning operation a first predetermined position may be utilized to have front-mounted display 512 be outside of electronic gaming device 100 to clean the sides of front-mounted display 512 and then a second predetermined position may be utilized to have front-mounted display 512 be inside of electronic gaming device 100 to clean the perimeter of display installation area. In another example, during game play the flush position may be utilized to give electronic gaming device 100 a high-tech feel that a player may enjoy. Any of the positions may be adjusted and/or maintained via data feedback from one or more sensors 1312.

One or more adjustable devices 1318 may be utilized in conjunction with and/or replace one or more springs 1316. One or more adjustable devices 1318 and/or one or more springs 1316 may be in any position (e.g., first display 602, wall of the display installation area 1104, back of the display installation area 1106, one or more front-mounted display interfaces 1108, one or more electrical attachment points 1109, input area 1110, one or more input devices 1112, second display 604, etc.).

One or more sensors 1312 may obtain and/or transmit one or more data points (e.g., positional data, temperature data, etc.) relating to front-mounted display 512, front-mounted interface area, front-mounted support area, front-mounted locking device 1004, 1010, one or more electrical attachment devices 902, one or more attachment areas 510, electronic gaming device 100, electronic gaming system 200, first display 602, wall of the display installation area 1104, back of the display installation area 1106, one or more front-mounted display interfaces 1108, one or more electrical attachment points 1109, an input area 1110, one or more input devices 1112, second display 604, front-mounted display screen 702, one or more alignment lines 616, 618, display interface locked area 1310, one or more electrical interconnection points 620, 630, 1308, one or more electrical wires 1306, one or more springs 1316, one or more motors 1314, one or more adjustable devices 1318, and/or one or more sensors 1312 to one or more processors.

FIG. 14 is an illustration of an unlocking mechanism, according to one embodiment. A fourth image 1400 may include an electronic gaming device 100, an electronic gaming device door 1402 (which as illustrated herein may be located at a front of the gaming device 100 and be movable between an open and a closed position), one or more front-mounted release holes 1404, and front-mounted release tool 1406. In one example, front-mounted release tool 1406 may be inserted into one or more front-mounted release holes 1404 to make contact with front-mounted support area, which unlocks front-mounted locking device or connector. By unlocking one or more front-mounted locking devices or connectors, front-mounted display may be removed. In another example, one or more electrical interconnection points 620, 630, 1308 one or more electrical attachment points 1109, and/or one or more electrical attachment devices 902 may be disconnected (e.g., physically and/or electrically). As illustrated, the locking devices may be configured to be accessible from the rear or back of the door 1402, such as when the door is in its open position.

Figure 15:
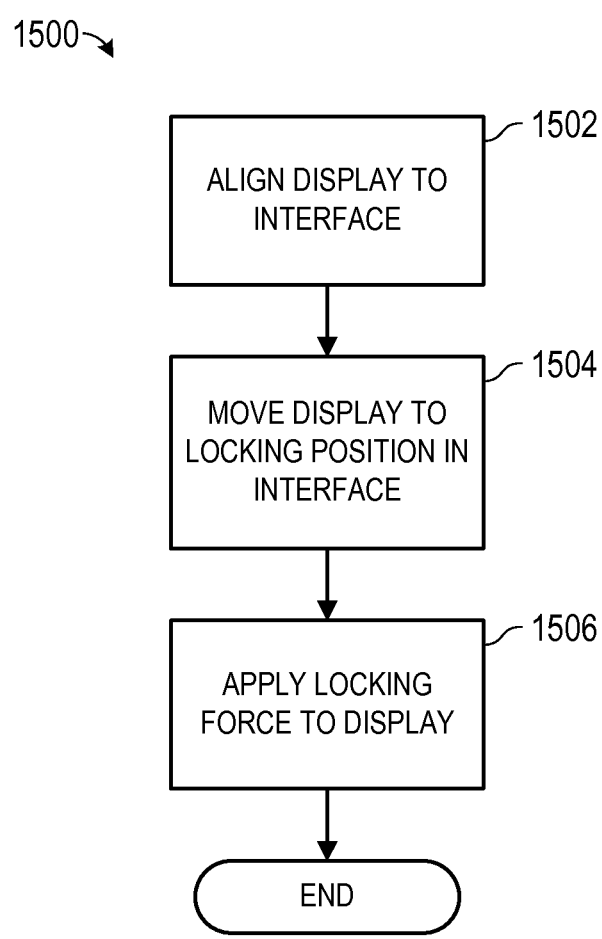
FIG. 15 is a flow diagram for installation of the front-mounted display, according to one embodiment.

FIG. 15 is a flow diagram for installation of the front-mounted display 1500, according to one embodiment. In one example, the method may include aligning the front-mounted display with the interface within electronic gaming device 100 (step 1502). The method may include moving the front-mounted display to one or more locking positions in front-mounted interface (step 1504). The method may include applying locking force and/or any other locking procedure to front-mounted display (step 1506). The method may end. In another example, one or more electrical interconnection points 620, 630, 1308, one or more electrical attachment points 1109, and/or one or more electrical attachment devices 902 may be connected (e.g., physically and/or electrically).

Figure 16:
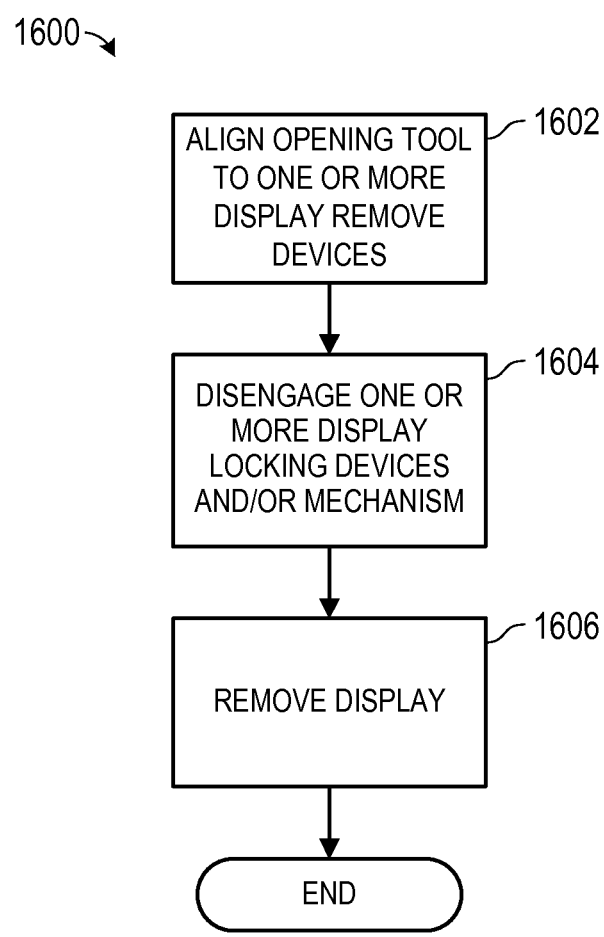
FIG. 16 is a flow diagram for uninstalling the front-mounted display, according to one embodiment.

FIG. 16 is a flow diagram for uninstalling the front-mounted display 1600, according to one embodiment. The method may include aligning opening tool to one or more front-mounted display removal holes (step 1602). The method may include disengaging one or more front-mounted display locking devices and/or mechanism (step 1604). The method may include removing the front-mounted display (step 1606). The method may end.

Figure 17:
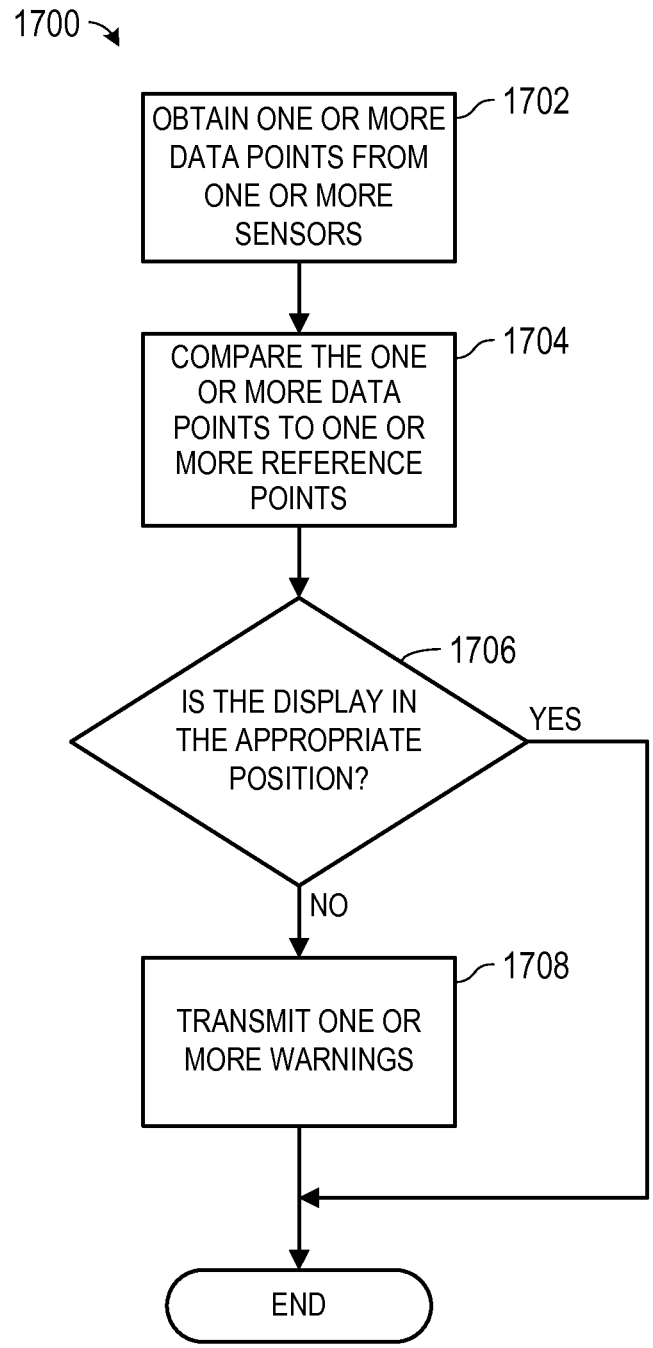
FIG. 17 is a flow diagram for verifying the installation of the front-mounted display, according to one embodiment.

FIG. 17 is a flow diagram for verifying the installation of the front-mounted display 1700, according to one embodiment. In one example, the method may include obtaining one or more data points from one or more sensors relating to one or more of electronic gaming device 100, the front-mounted interface, and/or the front-mounted display (step 1702). The method may include comparing the one or more data points to one or more reference points (step 1704). The method may include determining whether the front-mounted interface and/or the front-mounted display are in the appropriate positions and/or within a range of interrelationship positions with each other (step 1706). If the front-mounted interface and/or the front-mounted display are not in the appropriate positions and/or within a range of interrelationship positions with each other, then the method may transmit one or more warnings to an external device, to a server, to a mobile device and/or a warning device on electronic gaming device 100 (step 1708) and the method may end. If the front-mounted interface and/or the front-mounted display are in the appropriate positions and/or within a range of interrelationship positions with each other, then the method may end.

Any one or more of front-mounted display 512, front-mounted interface area 502, front-mounted support area 506, front-mounted locking device 508, one or more electrical attachment devices 902, one or more attachment areas 510, electronic gaming device 100, electronic gaming system 200, first display 602, wall of the display installation area 1104, back of the display installation area 1106, one or more front-mounted display interfaces 1108, one or more electrical attachment points 1109, an input area 1110, one or more input devices 1112, second display 604, front-mounted display screen 702, one or more alignment lines 616, 618, display interface locked area 1310, one or more electrical interconnection points 620, 630, 1308, one or more electrical wires 1306, one or more springs 1316, one or more motors 1314, one or more adjustable devices 1318, and/or one or more sensors 1312 may be substituted in any of the process flow charts.

In one example, front-mounted display may be aligned (e.g., in the correction position and/or within a tolerance range) with interface but not engaged with interface. One or more sensors may transmit this data to one or more processors, which may transmit one or more warnings.

In another example, front-mounted may be aligned (e.g., in the correction position and/or within a tolerance range) with interface and engaged with interface. However, interface substrate 504 may not be secured to electronic gaming device 100. One or more sensors may transmit this data to one or more processors, which may transmit one or more warnings.

Figure 18:
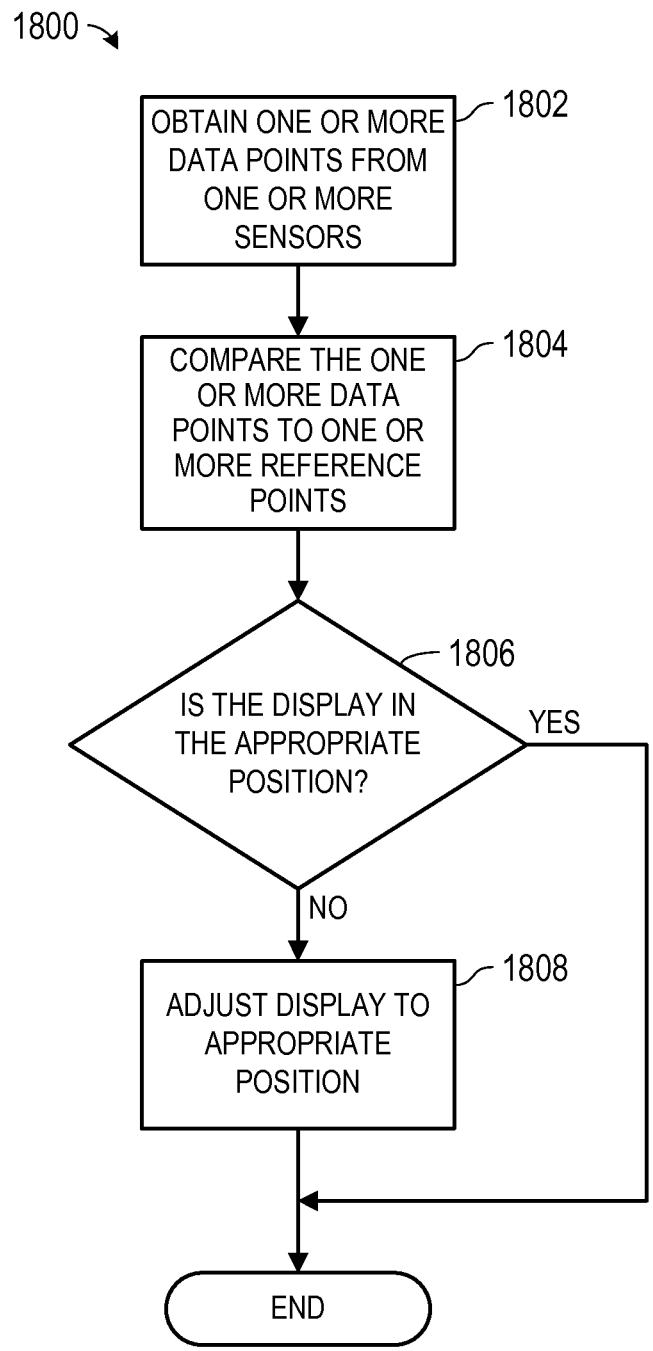
FIG. 18 is a flow diagram for adjusting the front-mounted display, according to one embodiment.

FIG. 18 is a flow diagram for adjusting the installation of the front-mounted display 1800, according to one embodiment. In one example, the method may include obtaining one or more data points from one or more sensors relating to one or more of electronic gaming device 100, the front-mounted interface, and/or the front-mounted display (step 1802). The method may include comparing the one or more data points to one or more reference points (step 1804). The method may include determining whether the front-mounted interface and/or the front-mounted display are in the appropriate positions and/or within a range of interrelationship positions with each other (step 1806). If the front-mounted interface and/or the front-mounted display are not in the appropriate positions and/or within a range of interrelationship positions with each other, then the method may adjust one or more adjustment devices to one or more appropriate positions (step 1808) and the method may end. If the front-mounted interface and/or the front-mounted display are in the appropriate positions and/or within a range of interrelationship positions with each other, then the method may end.

Any one or more of front-mounted display 512, front-mounted interface area 502, front-mounted support area 506, front-mounted locking device 508, one or more electrical attachment devices 902, one or more attachment areas 510, electronic gaming device 100, electronic gaming system 200, first display 602, wall of the display installation area 1104, back of the display installation area 1106, one or more front-mounted display interfaces 1108, one or more electrical attachment points 1109, an input area 1110, one or more input devices 1112, second display 604, front-mounted display screen 702, one or more alignment lines 616, 618, display interface locked area 1310, one or more electrical interconnection points 620, 630, one or more electrical wires 1306, one or more springs 1316, one or more motors 1314, one or more adjustable devices 1318, and/or one or more sensors 1312 may be substituted in any of the process flow charts.

In one example, front-mounted display 512 may not be within a predetermined range of electronic gaming device 100. Based on front-mounted display 512 not being within a predetermined range of electronic gaming device 100, one or more adjustable devices 1318 (and/or one or more springs 1316) may move front-mounted display 512, any element of front-mounted display 512 (e.g., front-mounted interface area 502, etc.), display installation area 1106, any element of display installation area 1106 (e.g., one or more front-mounted display interfaces 1108, etc.), any element of electronic gaming device 100, and/or any element of electronic gaming system 200 to one or more correcting points.

In another example, front-mounted interface area 502 may not be within a predetermined range of one or more front-mounted display interfaces 1108. Based on front-mounted interface area 502 not being within a predetermined range of one or more front-mounted display interfaces 1108, one or more adjustable devices 1318 (and/or one or more springs 1316) may move front-mounted display 512, any element of front-mounted display 512 (e.g., front-mounted interface area 502, etc.), display installation area 1106, any element of display installation area 1106 (e.g., one or more front-mounted display interfaces 1108, etc.), any element of electronic gaming device 100, and/or any element of electronic gaming system 200 to one or more correcting points.

In one example, one or more electrical attachment points 1109 on display installation area 1106 may not be connect to one or more electrical attachment devices 902 on front-mounted display 512. Based on one or more electrical attachment points 1109 on display installation area 1106 not being connected to one or more electrical attachment devices 902 on front-mounted display 512, one or more adjustable devices 1318 (and/or one or more springs 1316) may move front-mounted display 512, any element of front-mounted display 512 (e.g., front-mounted interface area 502, etc.), display installation area 1106, any element of display installation area 1106 (e.g., one or more front-mounted display interfaces 1108, etc.), any element of electronic gaming device 100, and/or any element of electronic gaming system 200 to one or more correcting points.

Figure 19:
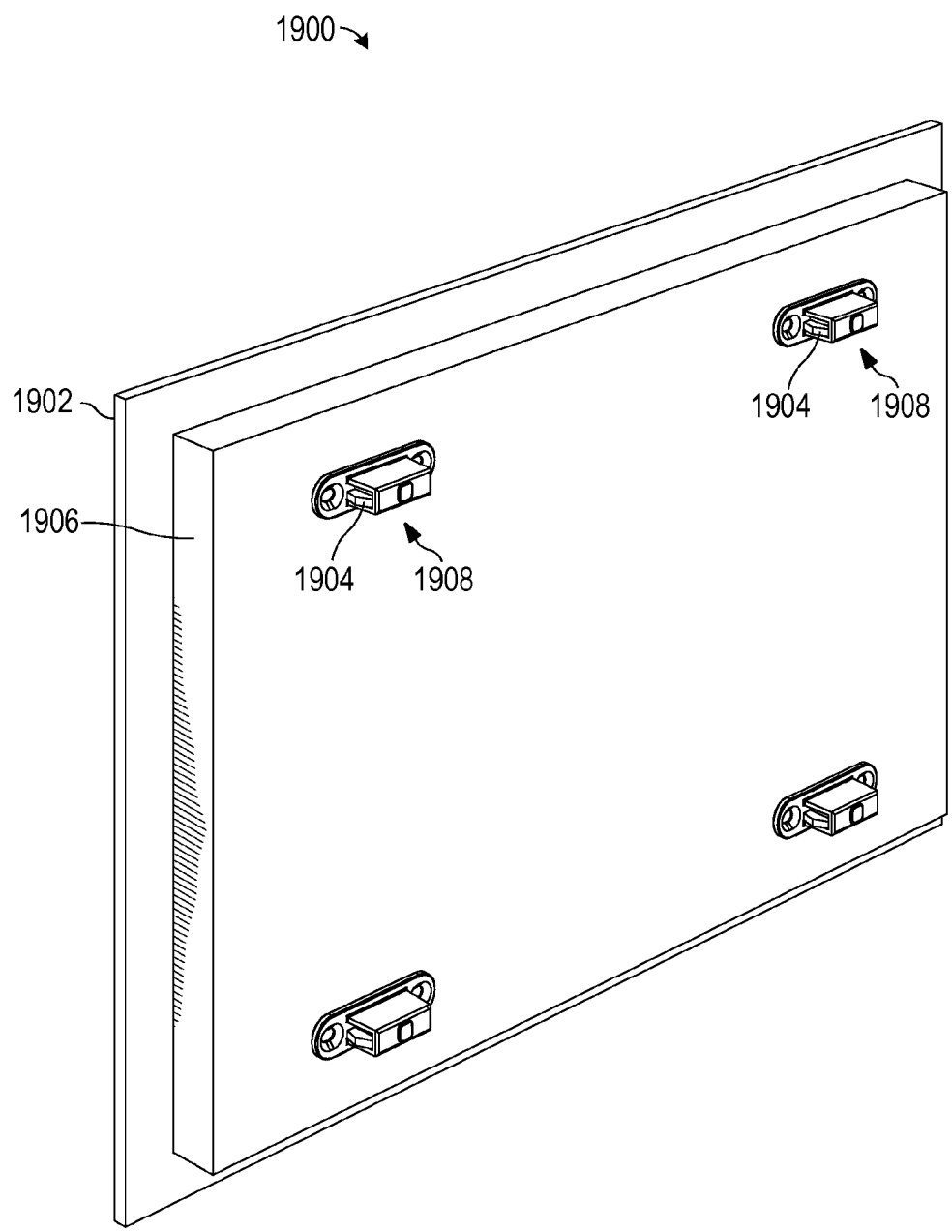
FIG. 19 is an illustration of a snap-and-click display, according to one embodiment.
Figure 20:
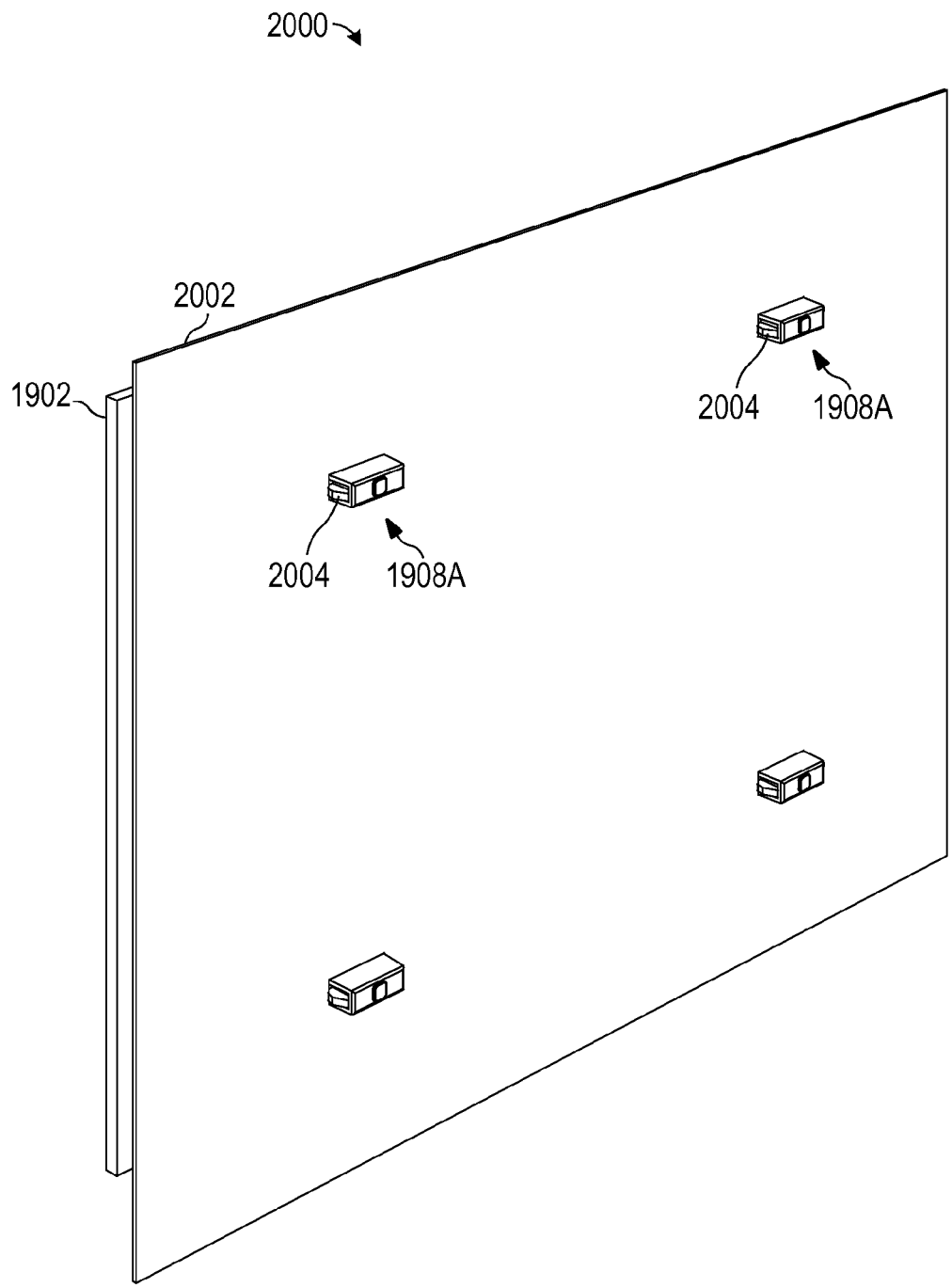
FIG. 20 is another illustration of a snap-and-click display, according to one embodiment.

In FIG. 19, a first back image of snap-and-click display 1900 may include a slot machine area 1902, front-mounted interface area 502 (e.g., snap-and-click display), snap-and-click device 1908, and a snap-and-click device tab in a locking position 1904. In one example, when snap-and-click device tab is in a locking position 1904, snap-and-click device 1908 (and/or snap-and-click display—See Reference Number 502) may be locked into one or more positions. In another example, a second back image of snap-and-click display 2000 (see FIG. 20) may include a display area on the slot machine area 1902 and a snap-and-click device in an unlocked position 1908A. In this example, snap-and-click device 1908 is in unlocked position 1908A because one or more snap-and-click device tabs are in an unlocked position 1908A.

Figure 21:
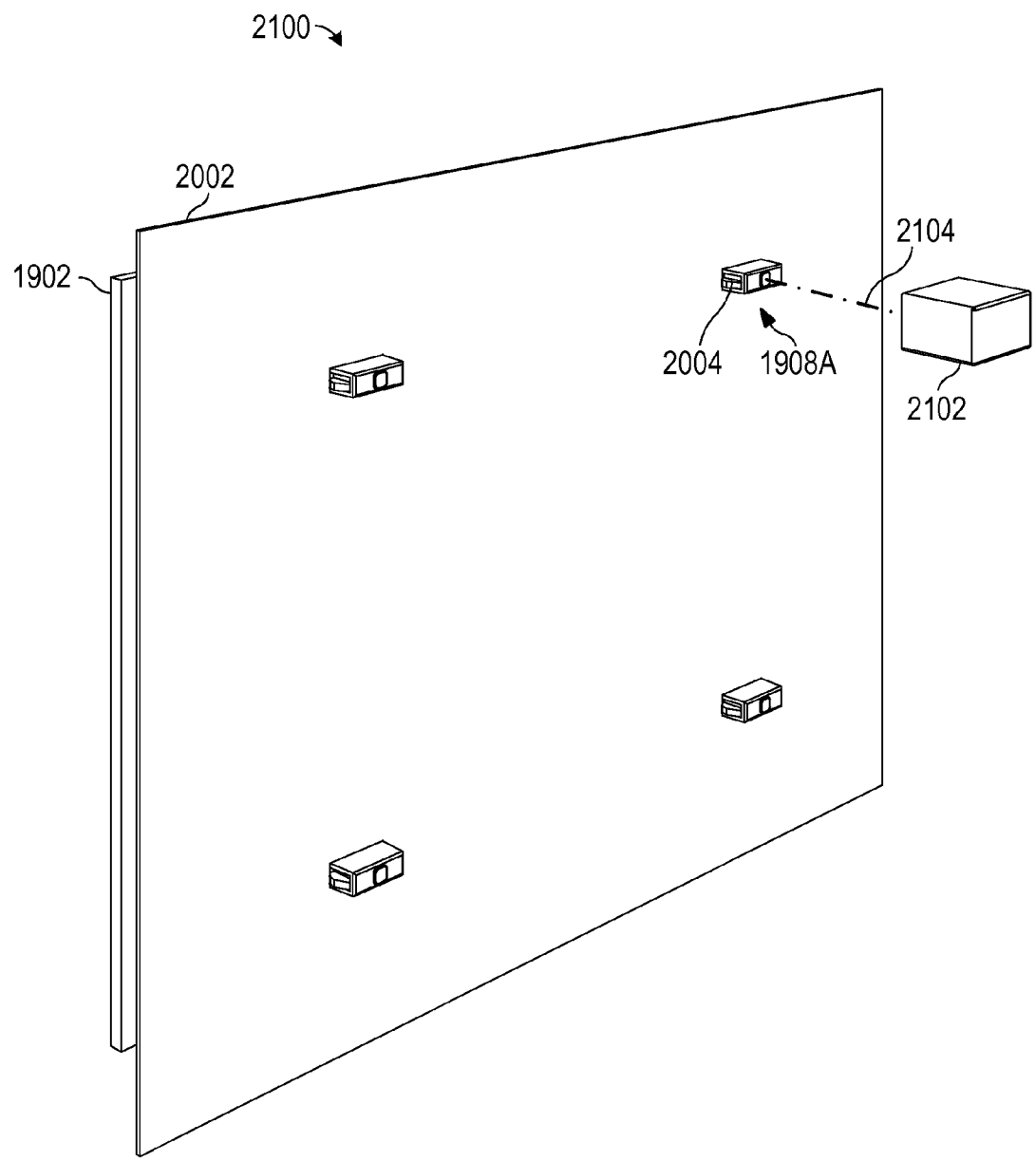
FIG. 21 is another illustration of a snap-and-click display, according to one embodiment.
Figure 22:
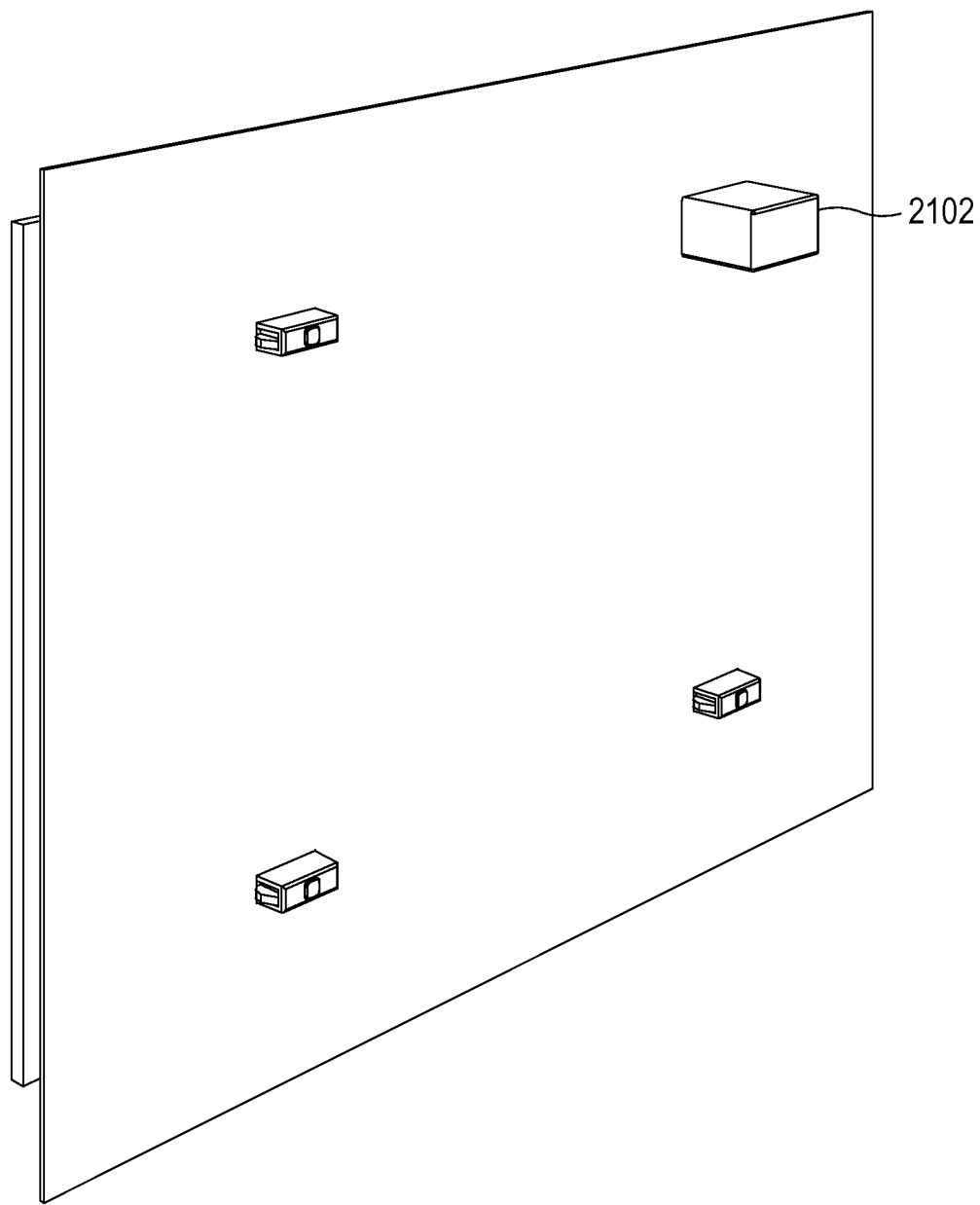
FIG. 22 is another illustration of a snap-and-click display, according to one embodiment.
Figure 23:
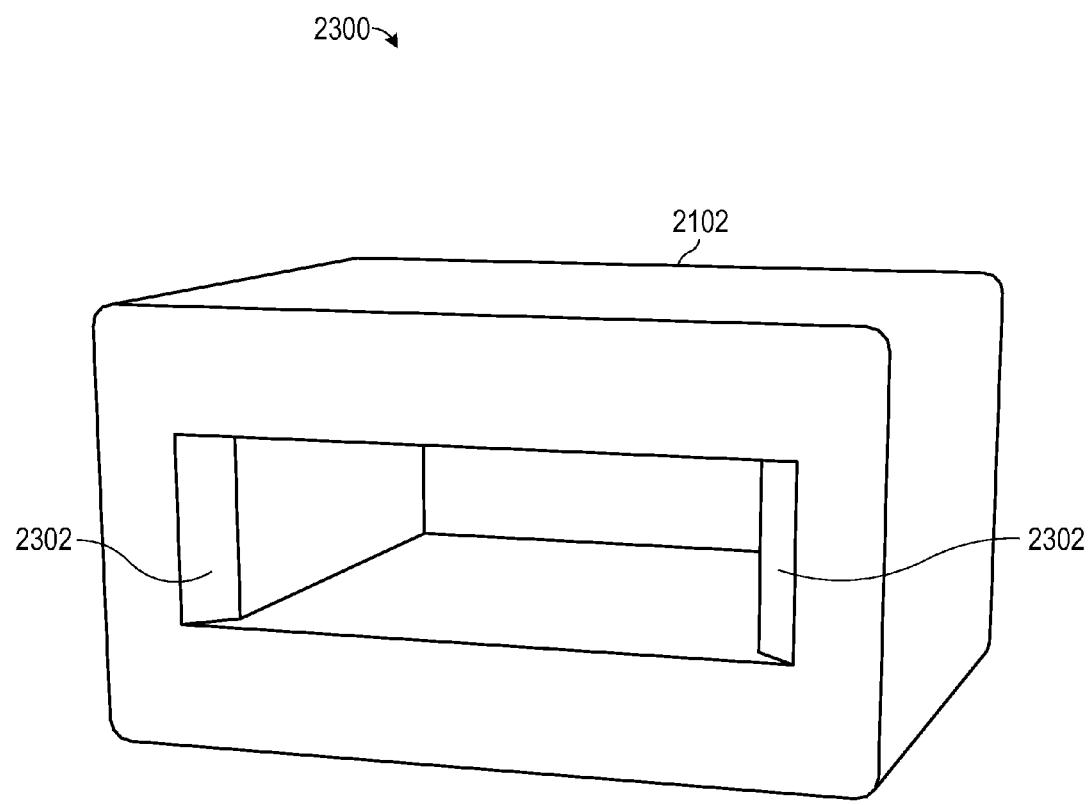
FIG. 23 is an illustration of an unlock device from a snap-and-click display, according to one embodiment

In FIG. 21, a third back image of snap-and-click display 2100 may include an unlocking device 2102 moving towards snap-and-click device 1908 via a first path 2104. Once unlocking device 2102 is placed over snap-and-click device 1908, snap-and-click device 1908 is in unlocked position 1908A because snap-and-click device tap(s) are in unlocked position (see FIG. 22). In one example, unlocking device 2102 may include an outer surface with one or more hollow areas 2302 which may be placed over one or more snap-and-click devices 1908 to place one or more tabs in one or more unlocked positions 1908A (see FIG. 23). In another example, front-mounted interface area 502 (e.g., snap-and-click display) and/or snap-and-click device 1908A may be removed/unlocked/moved by applying one or more of a removing, unlocking, and/or moving force.

In one embodiment, the electronic gaming device may include a plurality of reels. The one or more paylines may be formed on at least a portion of the plurality of reels. The electronic gaming device may include a memory.

In one embodiment, the electronic gaming device may include a display interconnection area. The display interconnection area may include an interface. The interface may include one or more connection areas. The one or more connection areas may connect with a front-mounted display.

In another example, the display interconnection area may include one or more electrical connection areas. The front-mounted display may include one or more electrical connection devices. The one or more electrical connection areas and the one or more electrical connection devices may be connected to each other. In another example, the one or more electrical connection areas and the one or more electrical connection devices may be electrically coupled to each other. In another example, the one or more processors may monitor a status of an electrical connection between the one or more electrical connection areas and the one or more electrical connection devices. In another example, the front-mounted display may include one or more front-mounted locking devices.

In another example, the one or more front-mounted locking devices may be released by contact with one or more unlocking points. In another example, the one or more front-mounted locking devices may detach an electrical connection between the one or more electrical connection areas and the one or more electrical connection devices based on contact with the one or more unlocking points.

In one embodiment, a method may include aligning a front-mounted display with one or more interconnection areas on a display interconnection area. The method may include placing the front-mounted display into one or more interconnection points. The method may include placing the front-mounted display into one or more lock positions with one or more interconnection points. The method may include locking one or more front-mounted locking devices.

In another example, the method may include connecting one or more electrical connection areas on the display interconnection area and one or more electrical connection devices on the front-mounted display.

In one example, the method may include electrically connecting one or more electrical connection areas on the display interconnection area and one or more electrical connection devices on the front-mounted display. The method may include measuring at least one of positional data and electrical data relating to one or more of the front-mounted display and the one or more interconnection areas on the display interconnection area. The method may include transmitting at least one of one or more positional data and one or more electrical data relating to the one or more of the front-mounted display and the one or more interconnection areas on the display interconnection area. The method may include comparing at least one of the one or more positional data and the one or more electrical data to one or more references. The method may include transmitting one or more warning based on a comparison of at least one of the one or more positional data and one or more electrical data to one or more references. The method may include transmitting one or more statuses based on a comparison of at least one of the one or more positional data and the one or more electrical data to one or more references.

In another embodiment, the interface for an electronic gaming device may include a surface including one or more attachment areas. The one or more attachment areas may attach to a front-mounted display via one or more front-mounted securing devices. The surface may include one or more electrical interconnection areas. The one or more electrical interconnections areas may be electrically coupled to the front-mounted display.

In another example, the one or more front-mounted locking devices may be released by contact with one or more unlocking points. The one or more front-mounted locking devices may detach an electrical connection between the one or more electrical interconnection areas and the front-mounted display based on contact with the one or more unlocking points.

Gaming system may be a "state-based" system. A state-based system stores and maintains the system's current state in a non-volatile memory. Therefore, if a power failure or other malfunction occurs, the gaming system will return to the gaming system's state before the power failure or other malfunction occurred when the gaming system is powered up.

State-based gaming systems may have various functions (e.g., wagering, payline selections, reel selections, game play, bonus game play, evaluation of game play, game play result, steps of graphical representations, etc.) of the game. Each function may define a state. Further, the gaming system may store game histories, which may be utilized to reconstruct previous game plays.

A state-based system is different than a Personal Computer ("PC") because a PC is not a state-based machine. A state-based system has different software and hardware design requirements as compared to a PC system.

The gaming system may include random number generators, authentication procedures, authentication keys, and operating system kernels. These devices, modules, software, and/or procedures may allow a gaming authority to track, verify, supervise, and manage the gaming system's codes and data.

A gaming system may include state-based software architecture, state-based supporting hardware, watchdog timers, voltage monitoring systems, trust memory, gaming system designed communication interfaces, and security monitoring.

For regulatory purposes, the gaming system may be designed to prevent the gaming system's owner from misusing (e.g., cheating) via the gaming system. The gaming system may be designed to be static and monolithic.

In one example, the instructions coded in the gaming system are non-changeable (e.g., static) and are approved by a gaming authority and installation of the codes are supervised by the gaming authority. Any change in the system may require approval from the gaming authority. Further, a gaming system may have a procedure/device to validate the code and prevent the code from being utilized if the code is invalid. The hardware and software configurations are designed to comply with the gaming authorities' requirements.

As used herein, the term "mobile device" refers to a device that may from time to time have a position that changes. Such changes in position may comprise of changes to direction, distance, and/or orientation. In particular examples, a mobile device may comprise of a cellular telephone, wireless communication device, user equipment, laptop computer, other personal communication system ("PCS") device, personal digital assistant ("PDA"), personal audio device ("PAD"), portable navigational device, or other portable communication device. A mobile device may also comprise of a processor or computing platform adapted to perform functions controlled by machine-readable instructions.

The methods and/or methodologies described herein may be implemented by various means depending upon applications according to particular examples. For example, such methodologies may be implemented in hardware, firmware, software, or combinations thereof. In a hardware implementation, for example, a processing unit may be implemented within one or more application specific integrated circuits ("ASICs"), digital signal processors ("DSPs"), digital signal processing devices ("DSPDs"), programmable logic devices ("PLDs"), field programmable gate arrays ("FPGAs"), processors, controllers, micro-controllers, microprocessors, electronic devices, other devices units designed to perform the functions described herein, or combinations thereof.

Some portions of the detailed description included herein are presented in terms of algorithms or symbolic representations of operations on binary digital signals stored within a memory of a specific apparatus or a special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the arts to convey the substance of their work to others skilled in the art. An algorithm is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Reference throughout this specification to "one example," "an example," "embodiment," and/or "another example" should be considered to mean that the particular features, structures, or characteristics may be combined in one or more examples.

While there has been illustrated and described what are presently considered to be example features, it will be understood by those skilled in the art that various other modifications may be made, and equivalents may be substituted, without departing from the disclosed subject matter. Additionally, many modifications may be made to adapt a particular situation to the teachings of the disclosed subject matter without departing from the central concept described herein. Therefore, it is intended that the disclosed subject matter not be limited to the particular examples disclosed.

The invention claimed is:

1. An electronic gaming device comprising:
a housing;
a door movably connected to the housing and located at a front of the housing, the door having a front and a rear, the door comprising a display interconnection area, the display interconnection area including an interface, the interface including a sunken area extending inwardly from the front of the door towards the rear thereof, the sunken area having an open front, a generally opposing closed bottom and a first sidewall, a second sidewall, a third sidewall, and a fourth sidewall, the interface further comprising at least one electrical connector located at the bottom of the sunken area;
an electronic video display, the electronic video display having a front and a rear, the rear located in the sunken area adjacent to the bottom and the front of the electronic video display facing outwardly of the door, at least one electrical connector of the electronic video display connected to the at least one electrical connector of the interface; and
at least one locking connector connecting the electronic video display to the door, the at least one locking connector accessible from the rear of the door.

2. The electronic gaming device of claim 1, wherein the display interconnection area further comprises at least one biasing member extending outwardly from at least one of the first, second, third and/or fourth sidewall and configured to bias the electronic video display in one or more directions within the sunken area.

3. The electronic gaming device of claim 2, wherein the least one biasing member comprises at least one of a spring and a motor configured to change a position of the electronic video display in the sunken area.

4. The electronic gaming device of claim 1, wherein the interface further comprises at least one sensor configured to sense a position of the electronic video display in the sunken area.

5. The electronic gaming device of claim 1, wherein the at least one electric connector of said electronic video display and the at least one electrical connector of the interface are configured to form an electrical connection to each other.

6. The electronic gaming device of claim 5, further including one or more processors where the one or more processors are configured to monitor a status of the electrical connection.

7. The electronic gaming device of claim 1, wherein the at least one locking connector is configured to be released by contact with one or more unlocking points.

8. The electronic gaming device of claim 1 wherein the at least one locking connector comprises a threaded fastener extending from the rear of the door into engagement with the electronic video display.

9. The electronic gaming device of claim 1 wherein the at least one locking connector comprises a pin extending from the electronic video display into a first end of an aperture in the door and therein a tool may be inserted into an opposing second end of the aperture.

10. A method of manufacturing an electronic gaming device comprising:
moving a front-mounted display into a sunken area of a display interconnection area located in a door of the electronic gaming device, the front mounted display comprising an electronic video display and the door movably mounted to a housing of the electronic gaming device, the door having a front and a rear and the sunken area extending into the front of the door and having a closed bottom and a first sidewall, a second sidewall, a third sidewall and a fourth sidewall;
engaging at least one electronic connector of the front mounted display with at least one electrical connector located at the bottom of the sunken area; and
engaging at least one locking connector in said sunken area to connect the front mounted display to the door, wherein the at least one locking connector is accessible at the rear of the door.

11. The method of claim 10, wherein the at least one locking connector is accessible at the rear of the door.

12. The method of claim 10, further comprising biasing the front mounted display into a position in the sunken area using at least one spring.

13. The method of claim 10, further comprising using at least one sensor to measure a location of the front mounted display within the sunken area.

14. The method of claim 13, further including transmitting location data from the sensor to at least one processor of the electronic gaming device.

15. The method of claim 14, further comprising comparing the location data to one or more references.

16. The method of claim 15, further comprising transmitting one or more warning based on the comparison of the location data and the one or more references.

17. The method of claim 10 wherein the step of engaging at least one locking connector comprises pressing a connector of the front mounted display into engagement with the door.

18. The method of claim 17 wherein the connector comprises a snap and click connector.

19. The method of claim 10 wherein the step of engaging at locking connector comprises extending at least one threaded fastener into engagement with the front mounted display from the rear of the door.

20. An interface for an electronic gaming device comprising:
a surface including one or more attachment areas, the one or more attachment areas being configured to attach to a front-mounted display via one or more front-mounted locking devices, the surface including one or more electrical interconnection areas, and the one or more electrical interconnections areas being configured to be electrically coupled to the front-mounted display, a sunken area having an open front and an extending into a front of the electronic gaming device to a closed bottom and the sunken area having a first sidewall, a second sidewall, a third sidewall and a fourth sidewall and the surface being located at the bottom of the sunken area, wherein the one or more front-mounted locking devices connects the front-mounted display to a door, the one or more front-mounted locking devices being accessible from the rear of the door.

21. The interface of claim 20, wherein the one or more front-mounted locking devices are configured to be released by contact with one or more unlocking points.

22. The interface of claim 21, wherein the one or more front-mounted locking devices are further configured to detach an electrical connection between the one or more electrical interconnection areas and the front-mounted display based on contact with the one or more unlocking points.

23. The interface of claim 22 wherein the sunken area is located in the door of the electronic gaming device, the door located at the front of the electronic gaming device.

* * * * *